(12) United States Patent
Antognini et al.

(10) Patent No.: US 12,366,788 B2
(45) Date of Patent: Jul. 22, 2025

(54) POWER-SCALABLE OPTICAL SYSTEM FOR NONLINEAR FREQUENCY CONVERSION

(71) Applicants: Paul Scherrer Institut, Villigen PSI (CH); Eidgenössische Technische Hochschule Zürich, Zurich (CH)

(72) Inventors: Aldo Antognini, Siggenthal Station (CH); Karsten Schuhmann, Stuttgart (DE)

(73) Assignees: Paul Scherrer Institut, Villigen PSI (CH); Eidgenössische Technische Hochschule Zürich, Zurich (CH)

( * ) Notice: Subject to any disclaimer, the term of this patent is extended or adjusted under 35 U.S.C. 154(b) by 131 days.

(21) Appl. No.: 18/258,875

(22) PCT Filed: Dec. 13, 2021

(86) PCT No.: PCT/EP2021/085504
§ 371 (c)(1),
(2) Date: Jun. 22, 2023

(87) PCT Pub. No.: WO2022/135999
PCT Pub. Date: Jun. 30, 2022

(65) Prior Publication Data
US 2024/0045305 A1 Feb. 8, 2024

(30) Foreign Application Priority Data
Dec. 22, 2020 (EP) .................................... 20216588

(51) Int. Cl.
*G02F 1/35* (2006.01)
*G02F 1/355* (2006.01)
(Continued)

(52) U.S. Cl.
CPC ............ *G02F 1/353* (2013.01); *G02F 1/3503* (2021.01); *G02F 1/3551* (2013.01); *G02F 1/37* (2013.01);
(Continued)

(58) Field of Classification Search
CPC ...... G02F 1/3503; G02F 1/353; G02F 1/3551; G02F 1/37; G02F 1/39; H01S 3/0092; H01S 3/109
See application file for complete search history.

(56) References Cited

U.S. PATENT DOCUMENTS 5,164,947 A    11/1992   Lukas et al.
5,297,156 A    3/1994   Deacon
(Continued)

FOREIGN PATENT DOCUMENTS

CN           1658450 A      8/2005
CN           101958505 B    9/2011
(Continued)

OTHER PUBLICATIONS

Rabi'Atul Adawiyah Mat Yusoff et al., Generation of Q-switched and mode-locked pulses using neodymium oxide as saturable absorber, Results in Optics, 2020, pp. 1-8.

*Primary Examiner* — Daniel Petkovsek
(74) *Attorney, Agent, or Firm* — Laurence A. Greenberg; Werner H. Stemer; Ralph E. Locher

(57) ABSTRACT

A system for frequency conversion of laser pump radiation includes an optical element for frequency conversion of lasers or laser beams with power scalability. The element has a nonlinear birefringent, thin plate crystal. A pump beam generates frequency-shifted radiation. Phase or quasi-phase matching conditions are in the crystal between beams. Frontside and backside of the crystal have high-reflective and partially-reflective coatings, obtaining intensity (Continued)

enhancement of the pump and frequency-converted radiation, and maintaining relative phase delay between beams, maximizing conversion efficiency. The crystal contacts a heat sink through the high-reflective coating, minimizing temperature inhomogeneity in the crystal. Intrinsic longitudinal heat flow provides power scalability. The element, used intra-cavity, acts as a wavelength-selective component forcing laser operation on resonance of the element, maximizing frequency conversion. The wavelength selectivity allows single-frequency operation of high-power lasers with intra-cavity frequency conversion.

22 Claims, 20 Drawing Sheets

(51) Int. Cl.
*G02F 1/37* (2006.01)
*G02F 1/39* (2006.01)
*H01S 3/00* (2006.01)
*H01S 3/109* (2006.01)

(52) U.S. Cl.
CPC .............. *G02F 1/39* (2013.01); *H01S 3/0092* (2013.01); *H01S 3/109* (2013.01)

(56) References Cited

U.S. PATENT DOCUMENTS

| | | | |
|---|---|---|---|
| 6,097,742 | A | 8/2000 | Caprara et al. |
| 6,834,064 | B1 | 12/2004 | Paschotta et al. |
| 8,477,410 | B2 * | 7/2013 | Hodgson ............... G02F 1/3532 |
| | | | 359/330 |
| 11,256,188 | B2 | 2/2022 | Kaneko et al. |
| 2002/0080841 | A1 | 6/2002 | Yin et al. |
| 2008/0055702 | A1 | 3/2008 | Ferrari |
| 2010/0103088 | A1 | 4/2010 | Yokoyama et al. |
| 2017/0104308 | A1 | 4/2017 | Yang et al. |
| 2020/0014543 | A1 | 1/2020 | Paterson et al. |
| 2021/0124236 | A1 | 4/2021 | Vodopyanov et al. |

FOREIGN PATENT DOCUMENTS

| | | |
|---|---|---|
| EP | 1236249 A1 | 9/2002 |
| JP | H03108785 A | 5/1991 |
| JP | H0575196 A | 3/1993 |
| JP | H06265953 A | 9/1994 |
| JP | 2006093560 A | 4/2006 |
| JP | 2019124854 A | 7/2019 |
| KR | 1020190139946 A | 12/2019 |
| WO | 2008093545 A1 | 8/2008 |
| WO | WO 2018108251 A1 | 6/2018 |

* cited by examiner

Prior Art

POWER-SCALABLE OPTICAL SYSTEM FOR NONLINEAR FREQUENCY CONVERSION

FIELD AND BACKGROUND OF THE INVENTION

This invention is related to a system for the nonlinear frequency conversion of laser light, that allows the scaling of the output power beyond the power output known in the state of the art systems.

7 Lasers combining high output power, good beam quality, and high wall-plug efficiency exist only in the spectral range from 1000 nm to 1100 nm. However, many industrial and scientific applications require high-power laser radiation with high beam quality and high plug-in efficiency in the visible or throughout the infrared spectrum. Examples are the welding of copper and pumping of Ti:Sapphire lasers. This shortage in the visible region is presently mitigated by frequency-doubling of near-infrared lasers. A commonly used technique is the intra-cavity second harmonic generation (SHG) as shown in FIG. 1, where a frequency-doubling nonlinear crystal is placed inside the active laser resonator for the fundamental mode at 1030 nm to produce laser radiation at 515 nm. The intra-cavity intensity enhancement and the absence of an out-coupling mirror for the fundamental (pump) mode lead to small losses and consequently high frequency-doubling efficiency.

Presently, high-power second-harmonic-generation relies on nonlinear crystals in the shape of rods of a few cm of length (both for intra-cavity and extra-cavity SHG) placed into a temperature controlled oven to optimize phase matching. The laser beam passing the nonlinear crystal along the rod axis, deposits some heat (due to residual absorption) that is transported radially (orthogonal to the beam propagation) from the beam position to the crystal surface (see FIG. 2) which is thermalized to a temperature-controlled heat sink. The heat deposition in the crystal and the geometry of the thermal contact give rise to a radial temperature gradient with maximal temperature along the rod axis (see FIG. 2). It can be shown that the temperature difference $\Delta T$ between the rod axis and the rod surface is $$\Delta T = \frac{\mu P}{4 \pi K L} \quad (1)$$

where P [W] is the power of the laser beam passing the crystal, $\mu$ the absorption coefficient for unit length, K the thermal conductivity of the crystal material and L the crystal length. In equation 1, homogeneous illumination of the crystal aperture is assumed. Larger $\Delta T$ are expected for any realistic cases. From this equation it can be seen that $\Delta T$ is linearly proportional to the laser power P[W], but it is independent (as shown also in FIG. 2 (left)) of the diameter of the nonlinear crystal assuming that the laser beam size is matched to the crystal diameter.

The intensity of the frequency-doubled beam $I_{SHG}$ [W/cm$^2$] produced by the pump beam at the output side of a crystal of length L takes the form (neglecting saturation effects)

$$I_{SHG} = \gamma I_p^2 L^2 \, sinc^2 \left( \frac{\Delta k L}{2} \right), \quad (2)$$

where $I_p$ [W/cm$^2$] is the intensity of the pump beam, $\Delta k = 2 k_{pump} - k_{SHG}$ the difference between the wave-vectors of the pump and the frequency-doubled beams, $\gamma = 2 \omega_p^2 d_{eff}^2 n_p^{-2} n_{SHG}^{-1}$, with $d_{eff}$ the effective nonlinear coefficient of the crystal, $\omega_p$ the angular frequency of the pump beam, $n_p$ and $n_{SHG}$ the refractive indices for the pump and the frequency-doubled beams, respectively. Hence, the conversion efficiency $\eta_{SHG}$ from the pump beam to the frequency-doubled beam is $$\eta_{SHG} = \frac{I_{SHG}}{I_p} = d_{eff}^2 I_p L^2 sinc^2 \left( \frac{\Delta k L}{2} \right). \quad (3)$$

As can be seen from these equations, the SHG process is severely limited by a possible phase mismatch ($\Delta k L \approx 0$). The phase matching strongly depends on the temperature of the nonlinear crystal as the wave-vector scales with the refractive index, and the refractive index depends on the temperature T: $\Delta k \sim n_p(T) - n_{SHG}(T)$. Hence, a large temperature gradient (large $\Delta T$) in the crystal means that phase-matching ($\Delta k << 1/L$) is possible only over a very limited portion of the nonlinear crystal resulting in back conversion and distortion of the transverse profile of the frequency-converted beam.

In principle, a large phase mismatch could be mitigated by reducing the crystal length L, but this would decrease the overall conversion efficiency ($\eta_{SHG} \sim I_p L^2$ see Equation 3). To compensate this decrease, the laser intensity $I_p$ could be increased. Yet, this intensity increase eventually leads to laser-induced damage of the nonlinear crystal.

Hence, power-scaling of the state-of-the-art SHG is not possible as the related thermal load and phase-mismatch ($\Delta k \sim T \sim P$) call for a reduction of the crystal length and an increase of the laser intensity, leading to optical-induced damage of the nonlinear crystal.

To date the main mitigation strategies of this issue involves:

Finding nonlinear crystal materials with lower absorption, higher thermal conductivity, larger damage threshold and larger nonlinear coefficients. Yet optimizing simultaneously all these parameters is challenging.

Improving the material quality of existing nonlinear crystals to reduce absorption and increase damage threshold.

Hence, the present day approaches do not solve the fundamental issue that power-scaling seems to require intensity-scaling that eventually is leading to laser-induced damages of the nonlinear crystal. For example, the output power obtained at 515 nm is presently limited by the heat generation in the nonlinear crystal, so that the full potential of the existing high-power lasers at 1030 nm cannot be fully exploited.

SUMMARY OF THE INVENTION

It is therefore the objective of the present invention to provide a power-scalable optical element for nonlinear frequency conversion (e.g. second-harmonic generation, half-harmonic generation, parametric down-conversion). When applied for example to high-power lasers at 1 μm this leads to high-power laser beams at 500 nm wavelength (via SHG) or to high-power lasers at wavelengths longer that 1 μm throughout the full infrared spectrum (via parametric down-conversion).

This objective is achieved according to the present invention by a system for frequency-conversion of a pump radiation, comprising:
  i) a laser source generating the pump radiation,
  ii) a nonlinear optical element for frequency-conversion of the pump radiation, said nonlinear optical element comprising a nonlinear birefringent crystal in the shape of a thin plate, wherein the size of the front-surface and back-surface of the thin plate in all directions is large compared to the thickness of the thin plate, said optical nonlinear element generating at least one frequency-converted beam as compared to the frequency of the pump radiation, wherein all involved beams propagate fulfilling phase matching or quasi-phase matching conditions in the said nonlinear optical element;
  iii) said nonlinear optical element comprising a partial reflective coating at the front surface and a high-reflective coating at the back-surface of the crystal yielding to resonant intensity enhancement of the laser pump radiation and at least one of the frequency-converted beams, wherein the high-reflective coating is designed to reflect all the involved wavelengths and to conserve or purposefully adjust the relative phase delay between the frequency-converted beam(s) and the pump radiation upon an internal reflection so that the relative phase delays between the various beams is maintained yielding optimal frequency-conversion, and wherein the nonlinear optical element is in thermal contact to a heat sink, preferably the back-surface of the high-reflective coating of the nonlinear optical element is in thermal contact to the heat sink;
  iv) said heat sink being controllable in temperature enabling efficient cooling of the crystal and generating a temperature gradient in the nonlinear crystal essentially orthogonal to the back-surface and approximatively in the direction of propagation of the laser beams, and minimizing the temperature inhomogeneity in the nonlinear crystal in particular in the transverse direction with respect to the direction of propagation of the laser beams, with the goal to decrease phase matching inhomogeneity between the various beams in particular in the transverse direction.

Preferred embodiments of the present invention are hereinafter listed in the depending claims.

Preferred embodiments of the present invention are hereinafter described in more detail with reference to the attached drawings.

DETAILED DESCRIPTION OF THE INVENTION

The present invention addresses the above described power scaling limitations of prior art and proposes an optical element for frequency-conversion of high-power lasers, wherein the power-scaling is obtained by scaling the pump beam size at constant pump intensity.

This invention exemplarily proposes an optical element that allows power-scaling of second-harmonic generation (SHG) enabling for example the generation of high-power laser beams at 515 nm when starting from a high-power thin-disk laser operating at 1030 nm. One of the possible application of this invention is welding of copper. Copper has a reflectivity of 97% for light at a wavelength of 1030 nm and has a very high thermal conductivity. Therefore, copper welding with a beam of 1030 nm wavelength is challenging as it requires a high power density. The needed power density and instabilities issues are however considerably reduced at a wavelength of 515 nm where the copper reflectivity is only 60%.

A variation of the proposed element can be used also to obtain frequency conversions of a pump radiation to longer wavelengths, extending thus the coverage of high-power lasers in a continuous way from 1 µm to the full infrared spectrum. In this case the doubly-resonant nonlinear element acts as an optical parametric oscillator (OPO) instead of a frequency-doubler. This OPO element could alleviate limitations for "eye-save" laser machining in the near infrared. Indeed, the proposed element could be used to deliver high-power laser beams with high beam quality and high wall-plug efficiency in the 2 µm wavelength region where the exposure limits for lasers is about three orders of magnitude higher than at 1.0 µm. In addition, the 2 µm radiation is suited for fiber transport.

Figure 4:
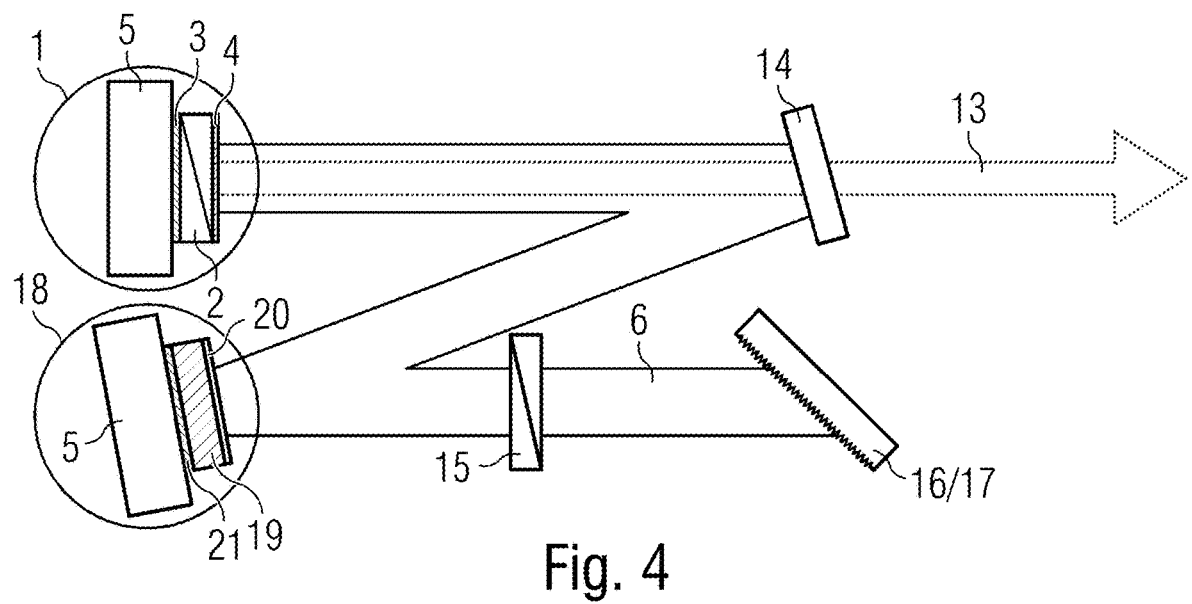
FIG. 4 schematically a thin-disk laser with intra-cavity frequency-doubling containing a doubly-resonant SHG element as proposed here.

The system according to the present invention comprises a nonlinear birefringent crystal in the shape of a thin plate, e.g. a disk with diameter D=20 mm and thickness L=0.5 mm, with two custom-made coatings: a high-reflector (HR), and a partial reflector (PR) forming a doubly-resonant intensity enhancement for the so called pump radiation and one of the generated beams, here with the backside of the coated nonlinear crystal thermally contacted to a heat sink. An example of an embodiment for intra-cavity frequency-doubling is shown in FIG. 4.

Figure 3:
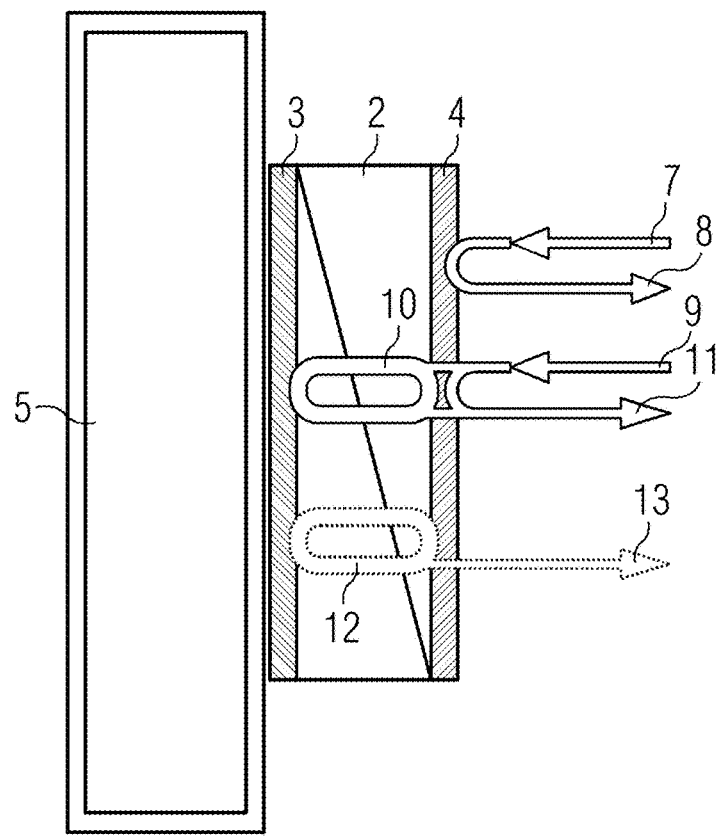
FIG. 3 schematically a double-resonant SHG element with power-scalability for nonlinear frequency conversion of high power laser radiation.

FIG. 3 depicts a scheme of the doubly-resonant SHG element comprising a nonlinear birefringent crystal 2 contacted to a heat sink 5. A high reflective coating (HR) 3 for pump and frequency-doubled wavelengths has been applied to the backside of the crystal 2 and a partially reflective coating (PR) 4 to its front side for both the pump and the frequency-doubled radiation. The nonlinear birefringent crystal 2 in this example has the shape of a disk; the diameter can be typically in the range from 5 mm to 30 mm (depending on the power demands) while the thickness can be typically in the range from 0.1 mm to 3 mm. The birefringent crystal 2 may also have the shape of a rectangular plate or a honeycomb-shape or the like.

In this example, one polarization component (i.e. the extra-ordinary polarization component) of the impinging pump radiation 9 to be resonant to the nonlinear optical element is assumed, and the other component (the ordinary polarization component) of the impinging pump radiation 7 to be off resonance. Thus, the incident pump radiation with the ordinary polarization 7 is simply reflected at the partly reflective coating (PR) 4 on the front side of the SHG element producing a reflected beam 8 with ordinary polarization. In contrast, the incident pump radiation with an extra-ordinary polarization 9 is coupled into the nonlinear crystal and undergoes back and forth propagations between the HR and PR coatings yielding to a resonant intensity enhancement of the circulating radiation 10. The part of the circulating pump radiation with extra-ordinary polarization transmitted from the nonlinear crystal through the PR coating is indicated by 11. The nonlinear crystal is designed such that the resonant pump radiation with extra-ordinary polarization 10 is phase matched to the frequency-doubled radiation 12 which is also intensity enhanced within the element. This doubly-resonance configuration with phase matching is leading to efficient frequency conversion.

Note that the role of the ordinary and extra-ordinary polarizations can be swapped throughout this patent depending on the crystal properties.

The SHG crystal 2 can be made for example from Lithium-Niobate (LNB) as it provides a non-critical phase-matching for frequency-doubling of a 1030 nm (pump beam) at room temperature. It is therefore well suited also for embodiments detailed later, where the beams impinge on the element with angles deviating from the normal incidence. LNB is cheap and less brittle than most other nonlinear crystals. A particularly advantageous property of LNB is its high nonlinear coefficient. A disadvantageous property is its high absorption coefficient that leads to heat generation in the nonlinear crystal. However, this issue can be handled by the efficient cooling of the here proposed doubly-resonant SHG element 2. An alternative material could be Beta Barium Borate (BBO); it provides high nonlinearity, low absorption, and high damage threshold. However, this material does not provide a non-critical phase matching. Another alternative material could be Lithium Borate (LBO); it provides a high damage threshold and a large acceptance angle.

Suitably, the temperature stabilized heat sink 5 is realized as a disk of diamond. Diamond has the highest thermal conductivity of any material around room temperature while providing excellent stiffness, and low thermal expansion. When the nonlinear crystal is cemented to such a diamond support and the diamond support is cooled, the phase distortions caused by the thermal load produced by the laser beams are minimized. Alternatively, the HR side can be contacted for example to a SiC heat sink or to metallic heat sinks (ideally copper). Direct cooling of the HR-coating with fluids or gases is also another possibility.

FIG. 4 depicts a schematic of a thin-disk laser with intra-cavity frequency-doubling containing the doubly-resonant SHG element 1 as proposed in this patent, a dichroic mirror 14, an active medium in the form of a thin disk 18, a quarter wave plate 15, and a grating acting as frequency and polarization selective element (16 and 17, respectively). This design represents a particularly favorable embodiment where both the active medium 18 and the doubly-resonant SHG element 1 have similar power scalability and where the active medium gain is similar to the frequency-conversion efficiency in the SHG element. The placement of the quarter-wave-plate 15 is such to provide twisted-mode-operation of the laser, minimizing spatial hole burning in the thin disk 18. The interplay of the ordinary and extra-ordinary polarizations in the doubly-resonant SHG element 1, the quarter-wave-plate 15, and the polarization selective element 17 provides wavelength selectivity leading to single-frequency operation when the element is placed in an active laser resonator. In order to stress the similarity of the cooling principle of the doubly-resonant SHG element 1 to the cooling principle of the thin-disk laser 18, also the structure of the thin-disk is detailed in the figure.

Figure 5:
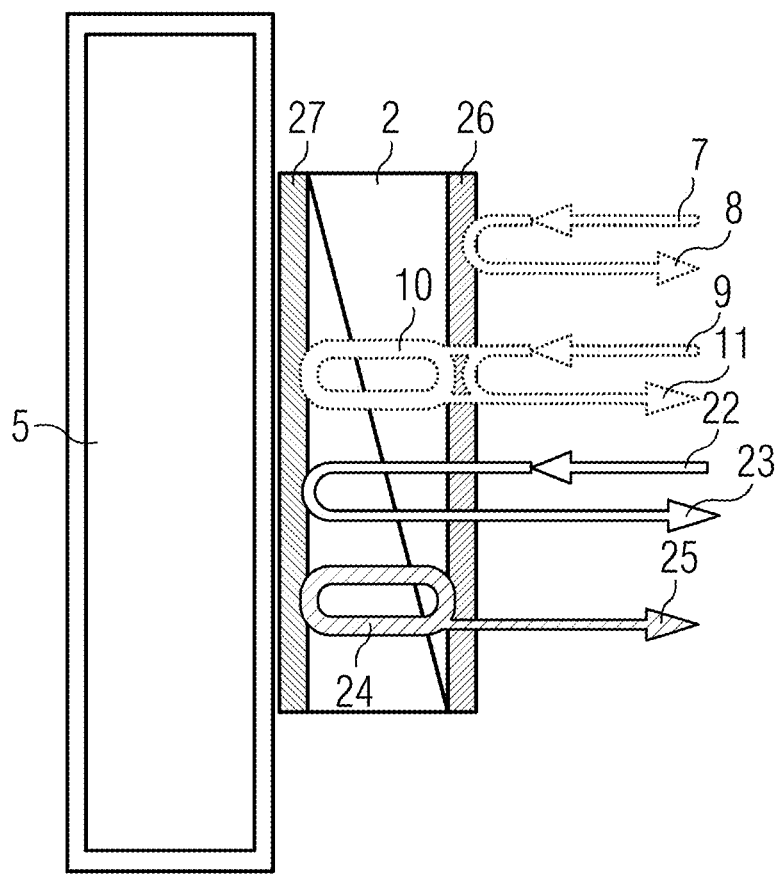
FIG. 5 schematically a doubly-resonant OPO (optical parametric oscillator) element similar to the doubly-resonant SHG element of FIG. 3.

FIG. 5 depicts a scheme of the doubly-resonant OPO element which is having a structure similar to the doubly-resonant SHG element. In this figure, it is assumed that the wavelength of the pump beam matches a resonance of the nonlinear optical element 1 for a certain polarization component while the other polarization component is not resonant. Hence, the incident pump radiation with non-resonant polarization 7 is simply reflected on the partly reflective coating (PR) 4 on the front side of the nonlinear optical element 1 to form the beam 8. In contrast, the pump beam with resonant polarization component 9 is resonantly enhanced forming a circulating radiation 10 of large intensity apt for nonlinear conversion. Part of the circulating radiation escapes the nonlinear optical element 1 forming the beam 11. The resonant pump radiation 10 is phase-matched and frequency-converted into signal and idler radiations. In this specific case the PR coating partially reflects the idler radiation so that the idler radiation is resonantly enhanced 24 in the doubly-resonant nonlinear optical element 1. Moreover, the PR coating is designed to transmit the signal radiation. Hence, the signal radiation generated in the element is out coupled 23 while an impinging signal beam 22 is being transmitted into the crystal 2 and reflected at the HR coating 27. Note that the role of signal and idler can be swapped throughout this description.

3 Also in this case the nonlinear material for the OPO-element 2 can be Lithium-Niobate (LNB) as it is transparent up to a wavelength of 4 μm. An alternative material could be Lithium Indium Selenide (LISE) as it exhibits transparency up to 7 μm.

There are five innovative considerations relevant in the context of the invention:

1. Nonlinear birefringent crystal in the shape of a thin plate with a high reflective coating (HR) for all involved wavelengths contacted to a heat sink, preferably on its backside. The resulting efficient cooling and one-dimensional heat flow leads to improved phase matching between the fundamental and the frequency-converted radiations, and to an arbitrary power-scalability for frequency-conversion.
2. A partly reflective coating (PR) on the front side for realizing a doubly-resonant cavity that resonantly enhances the intensities of the pump and at least one of the frequency-shifted radiations generated in the nonlinear crystal. These resonant enhancements of the intensities lead to efficient frequency-conversion and compensate for the small thickness L of the nonlinear crystal.
3. For all possible embodiments (applications) of the optical nonlinear element, the HR coating needs to reflect the pump and all the frequency-converted beam(s) of different wavelengths with an appropriate relative phase shift, so that the correct phase relation for efficient frequency-conversion of the pump holds continuously while the various beams propagate back and forth in the nonlinear crystal. For several applications, e.g. when the element is used for frequency-doubling or frequency-halving, also the PR coating needs to conserve the relative phase relation between pump and frequency-shifted radiations upon an internal reflection. Small mismatches of the relative phase delay upon a reflection at the HR or PR coatings can be compensated in the propagation through the nonlinear crystal by slightly changing the refractive indices seen by the pump and the frequency-converted beams through a fine tuning of the birefringent crystal temperature.

Alternatively, the HR and PR coatings can be designed to realize a quasi-phase-matched configuration where a deviation from perfect phase matching in the nonlinear crystal is compensated by an appropriate (opposite) phase delay at the coatings.
4. The PR-HR coated nonlinear crystal not only acts as a frequency-converting element with doubly-resonant intensity enhancement for the pump and one of the frequency-converted radiations, but also acts as a birefringent Gires Tournois interferometer (BGTI). Combined with a λ/4-plate and a polarizer the BGTI forms a frequency-selective element with highest (unity) transmission at the resonances of the optical nonlinear element (see FIGS. 6, 7 and 8). Thus, the polarizer+λ/4-waveplate+BGTI system used in a laser resonator forces the laser to operate at a frequency (wavelength) that matches automatically one of the resonances of the nonlinear element. Hence, the laser is forced by the proposed element itself to operate at a wavelength that yields maximal frequency-conversion. When including into an active laser resonator the proposed element and an additional wavelength-selective optical component, also single-frequency operation can be obtained. The optical nonlinear element thus leads to efficient intra-cavity frequency conversion with power scalability, forces laser operation at a wavelength where optimal frequency-conversion occurs, and paves the way to obtain single-frequency operation.
5. The wavelength-dependent rotation of the polarization that occurs in the nonlinear element can be used to obtain an error signal via a Hänsch-Couillaud-like locking scheme to match continuously the frequency of the active laser resonator (pump) with the resonances of the nonlinear element. In this way single-frequency operation without mode jumps is obtained.

Disk-Shaped Nonlinear Crystal and Power Scalability

The presented optical nonlinear element is a nonlinear crystal in the shape of a thin plate with large size of the front- and back-surfaces in all directions compared to the length (thickness) of the crystal. A reflective coating on the back side of the nonlinear crystal allows access to the back of the crystal as this is not exposed to the laser radiation. This allows to contact the nonlinear crystal to a heat-sink as shown in FIG. 3. This results in a one dimensional heat flow pointing along the disk axis (which is also the laser pump beam axis) and in an efficient cooling because of the large ratio cooling surface to heat-generation volume (heat transport over a small path L). The efficient cooling results in small temperature inhomogeneity within the crystal that implies small phase mismatches ($\Delta k \sim \Delta T$).

Figure 1:
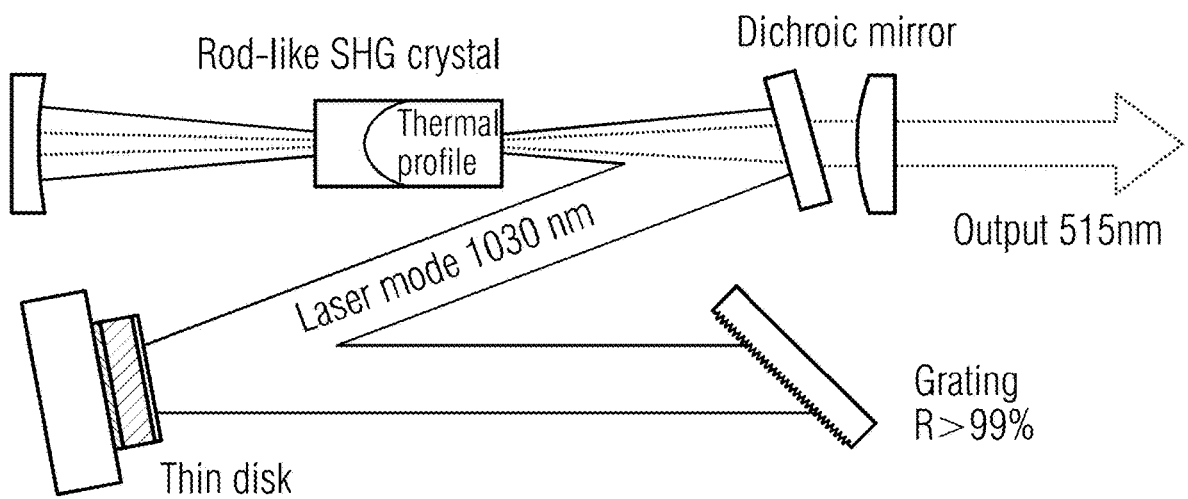
FIG. 1 schematically a thin-disk laser with intra-cavity frequency doubling using a rod-like SHG crystal according to the prior art; in red and green are given the pump and frequency-doubled mode, respectively.
Figure 2:
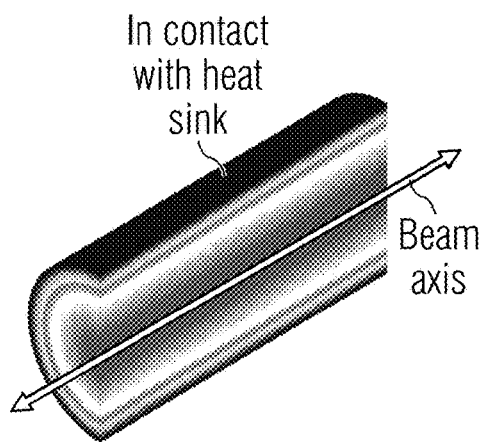
FIG. 2 (Left) Temperature distribution in the rod-like SHG crystal passed axially by a laser beam and cooled at its surface according to the prior art. In red is given the hottest temperature, in blue the coldest; (Right) Temperature distributions in a rod-like crystal for two laser beam sizes but identical laser power.
Figure 2:
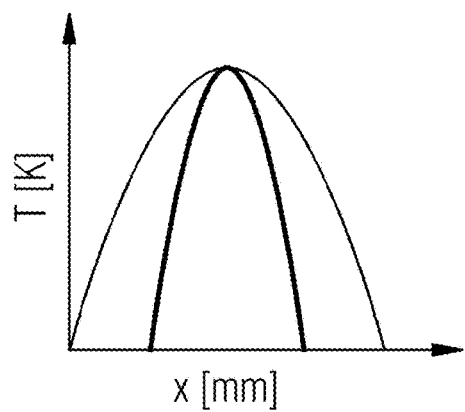

The most important consequence of the disk-heat-sink geometry (one dimensional heat flow) is that the temperature depends only on the pump beam intensity $I_p$ [W/cm$^2$] but does not depend on the overall pump power P[W]. On the contrary, the temperature difference $\Delta T$ of the state-of-the-art depends on the power but does not depend on the intensity as shown in FIG. 2, left. Combined with the fact that also the conversion efficiency η depends on the intensity of the pump radiation ($\eta \sim I_p$), an increase of the laser power at constant intensity $I_p$ does not change neither the temperature inhomogeneity ΔT, nor the conversion efficiency η, nor the optical-induced damage threshold. Hence the output power of the here proposed element can be scaled without decreasing its performance simply by increasing the transverse size of the pump beam at the element at constant pump intensity $I_p$.

This is the fundamental property underlying the power-scalability of the frequency-conversion through our proposed element, alike the power-scalability of thin-disk lasers where the laser power is increased by scaling the laser mode size at constant intensity. Hence, the proposed element acts as a nonlinear optical frequency converter with power limited only by the power of the pump radiation.

Double-Resonant Intensity Enhancement

From Equation 3, the reduction of the nonlinear crystal from few cm as in the state-of the-art, to for example a fraction of mm as in the proposed geometry, would lead to a decrease of the conversion efficiency by about two orders of magnitude. This issue (which holds also for other non-linear frequency-conversion processes as parametric down-conversion and frequency-halving) is solved in the present invention by coating the two faces of the thin nonlinear crystal so that the backside is acting as a high reflector (HR) for the pump and the frequency-converted beams, and the front side is acting as a partial reflector (PR) for the pump and one of the frequency-converted beams (see FIGS. 3 and 5). For appropriate relative phase delays between the various beams upon an internal reflection at the HR or PR coatings, the coated nonlinear crystal acts as a doubly-resonant cavity simultaneously for the pump and one of the frequency-shifted beams. This results in a considerable increase of both beam's intensities that leads to an increase of the frequency-conversion efficiency (see Equation 3 for the SHG case). For the SHG case the effect of the PR coating on the conversion efficiency can be summarized by the following equations describing the conversion efficiencies for three cases: without PR coating, with a PR coating reflecting only the pump wavelength (single-resonant), and with a PR coating reflecting both the pump and the frequency-doubled radiation (doubly-resonant):

$$\eta_{SHG/DP} = 4\gamma I_P L^2 \quad \text{(no PR coating)} \tag{4}$$

$$\eta_{SHG/SR} = 4\gamma I_P L^2 \left(\frac{4}{1-R_p}\right)^2 \quad \text{(single resonant)} \tag{5}$$

$$\eta_{SHG/DR} = 4\gamma I_P L^2 \left(\frac{4}{1-R_p}\right)^2 \frac{1-R_{SHG}}{\left(1-\sqrt{R_{SHG}}\right)} \quad \text{(doubly-resonant)} \tag{6}$$

where $R_p$ is the reflectivity for the pump radiation, and $R_{SHG}$ the reflectivity for the frequency-doubled beam at the PR coating. If we assume $R_p=R_{SHG}=0.9$ the conversion efficiency for a doubly-resonant element increases by a factor of about 60'000 relative to the conversion efficiency of an element without any PR coating. Similar enhancements have to be expected for other nonlinear processes.

Phase Shifts at the HR and PR Coatings

Frequency-conversion in the birefringent nonlinear crystal occurs when there is phase matching between all involved beams (pump and frequency-converted beams). Moreover, as visible from Equation 6 for the SHG case, efficient frequency-conversion is obtained only when the intensities of the pump and one of the frequency-converted beam are enhanced. This doubly-resonant condition implies that when the pump beam frequency matches a resonant frequency of the element, also the frequency of the radiation generated in the element matches a resonance of the element. More precisely this doubly-resonant condition is reached when both the pump and one of the frequency-converted beams in a roundtrip undergo a phase shift corresponding to a multiple of $2\pi$, i.e. when for both beams following condition holds:

$$2kL+\Delta\varphi_{coating}=2\pi N, \tag{7}$$

where $N \in \mathbb{Z}$ and $\Delta\varphi_{coating}=\Delta\varphi_{HR}+\Delta\varphi_{PR}$ is the sum of the phase shifts upon an internal reflection at the HR and PR coatings, respectively.

This doubly-resonant enhancement can be obtained also when it is not possible to have perfect phase matching in the nonlinear medium. For this purpose, the phase shifts at the coatings have to be correspondingly designed to fulfill the Equation 7. In this way a quasi-phase-matching configuration can be obtained.

The coating designs have to provide optimal relative phase relation between the various involved beams while the beams propagate back and forth in the nonlinear element. Moreover, the coatings must provide simultaneous intensity enhancements of the pump and one of the frequency-converted beam. Depending on the involved nonlinear process the coating design is having slightly different properties:

SHG For the second-harmonic generation (SHG with $\omega_{SHG}=2\omega_p$) the doubly-resonance condition is reached if the following properties are met:

Firstly, the refractive indices of the two beams in the nonlinear crystal have to be equal ($n_{SHG}=n_p$ so that $k_{SHG}=2 k_p$. This is possible because the pump and the frequency-doubled beams are propagating in the birefringent nonlinear crystal with orthogonal polarization. Note that this condition corresponds to a Type I phase matching condition in the nonlinear crystal needed in the first place for the nonlinear process. Secondly, upon an internal reflection at the HR and PR coatings the two beams (pump and frequency-doubled) must not lose their relative phase relation. This means that the phase at each internal reflection must change accordingly to $\Delta\varphi_{SHG}=2\Delta\varphi_p$. With these relative phase shifts at the coatings, the relative phase of the pump and frequency-doubled beams is continuously matching while the beams propagate back and forth in the nonlinear crystal resulting in the optimal condition for frequency-conversion.

Moreover, when the phase shift of the pump in a round-trip in the element is $2\pi$ N (resonant condition), then the frequency-doubled beam undergoes a phase shift of $4\pi$ N. Thus, also the frequency-doubled beam fulfils the resonance condition so that the required doubly-resonant condition is obtained. Note that a change of the crystal thickness leads to a change of the element's resonance frequencies: still the conditions for doubly-resonance and phase matching are fulfilled. These properties greatly simplify the production of the SHG element: On the one hand, because no particular control of the crystal thickness is needed, on the other hand, because the HR and PR coatings do not depend on the crystal thickness. Coating of a batch of substrates having different thicknesses is possible.

In contrast Type II phase matching would require a much better control of the crystal thickness because in this case the ordinary and extra-ordinary polarization components must accumulate a round-trip phase delay of $2\pi$ M, where M is an integer.

Summarizing, the SHG element is acting as a doubly-resonant intensity enhancing cavity for the pump and the frequency-doubled radiation while fulfilling the phase-matching conditions needed for the nonlinear conversion and keeping the correct phase relation between pump and generated beam to optimize conversion. Similarly, for quasi phase-matched conditions the HR and PR coatings can be designed to compensate the relative phase delay accumulated while the beams propagate in the nonlinear crystal by generating an inverse phase delay upon internal reflections at the coatings so that Equation 7 holds.

HHG The nonlinear element can be designed to operate as a frequency-halving element, where each pump photon is split into two photons having the same frequency so that $\omega_p = 2\omega_{HHG}$. Similar to SHG, to obtain doubly-resonant intensity enhancement and continuous phase matching for the half-harmonic generation (HHG), following conditions must hold: Firstly, the refractive index for the pump and frequency-halved radiation have to be equal so that $k_p = 2k_{HHG}$.

Secondly, the phase shifts at the HR and PR coatings must obey the relation $\Delta\varphi_p = 2\Delta\varphi_{HHG}$. Alternatively, the HR and PR coatings can be designed to realize a quasi-phase-matched configuration where a deviation from perfect phase matching in the nonlinear crystal is compensated by an inverse relative phase delay at the coatings.

Similar to the SHG case, no particular control of the crystal thickness is needed, and the HR and PR coating's designs do not depend on the crystal thickness.

OPO The proposed coated nonlinear element can be designed to act as an optical parametric oscillator (OPO) that splits the pump photons into idler and signal photons fulfilling energy conservation ($\omega_p = \omega_{idler} + \omega_{signal}$). In this process thus three different wavelengths are involved (the HHG is a special case of the more general OPO process).

Also in this case the nonlinear process requires phase matching between the three beams with wave-vectors $k_p = k_{idler} + k_{signal}$.

Apparently the simplest solution would be to make the proposed element resonant for all three wavelengths. Its realization must thus account for the different phase velocities of the three beams in the nonlinear crystal yielding different round-trip phase delays which depend linearly also on the thickness of the element. Hence, the coating design requires knowledge of the nonlinear crystal thickness on the nm level.

Therefore, the most promising OPO design based on the proposed element would be resonant for pump and one of the generated beams (for example the idler). In this design an external cavity for the signal radiation would be used to provide triple-enhancement and to provide longitudinal and transversal mode stability. This external cavity can be tuned by changing its length to reach a triple-resonant condition independent of the crystal thickness.

The best conversion-efficiency in this case is obtained when the HR coating is reflective for all three wavelengths and the relative phase shifts upon an internal reflection at the HR coating obeys the relation $\Delta\varphi_p = \Delta\varphi_{signal} + \Delta\varphi_{idler}$.

The PR coating needs to be partly reflective for pump and idler but acting preferably as an anti-reflex coating for the signal. The relative phase delay between pump and idler upon an internal reflection at the PR coating does not necessarily needs to be conserved. Indeed, the phase matching condition ($\Delta\varphi_p = \Delta\varphi_{signal} + \Delta\varphi_{idler}$) can be also obtained by adapting the phase of the signal $\Delta\varphi_{signal}$ (i.e. by changing the length of an external signal cavity).

Also in this case the HR coating can be designed to realize a quasi-phase-matched configuration where a deviation from perfect phase matching in the nonlinear crystal is compensated in each round trip in the element by an appropriate phase delay at the coating. Note that in this description and in all embodiments with the OPO element the roles of signal and idler can be swapped.

Dedicated coating designs are thus needed for all three cases, with appropriate reflectivities and phase delays for two or more wavelengths. Standard dichroitic coatings usually do not provide the needed relative phase changes upon an internal reflection. A mismatch of the relative phase delay upon an internal reflection results in a decrease of the conversion efficiency. In the worst case, when the mismatch is of 180°, the frequency-converted beam is back-converted into the pump beam decreasing the overall efficiency of the process. Because in the doubly-resonant nonlinear element multiple reflections are occurring, there is potentially a large sensitivity to inappropriate relative phase changes upon reflection at the coatings. Even though it is possible to design the coatings with the desired relative phase delays, it is difficult to control it during the production process. We therefore need to cope with some degree of mismatch from the ideal relative phase delays upon reflection. This, however, is not really an issue because small mismatches (of the relative phase delay from ideal condition) upon reflection at the coatings can be compensated by generating the inverse mismatch in the nonlinear crystal by a small temperature tuning of the nonlinear crystal.

Wavelength-Selection and Single-Frequency Operation

The coated disk-shaped nonlinear crystal acts not only as a wavelength converter but also as a birefringent Gires-Tournois interferometer (BGTI) causing different phase delays for the ordinary and the extra-ordinary polarizations of the pump beam. This different phase delay between the two polarizations of the pump beam, in combination with a polarizer (Brewster plate, thin-film polarizer or grating) and a $\lambda/4$-plate (FIGS. 4 and 6) leads to a wavelength-selectivity (FIG. 7) with minimal losses (FIG. 8) when the laser pump wavelength is resonant with one of the BGTI resonances. This wavelength selectivity forces thus the laser to operate at a frequency resonant to the BGTI. Because at resonance the intensity of the light circulating in the proposed nonlinear element is maximal, optimal frequency-conversion efficiency is continuously guaranteed. In short, for intra-cavity applications, the nonlinear element in combination with a polarizer and a $\lambda/4$-plate is forcing laser operation at a frequency resonant to itself (to the resonances of the nonlinear element), so that maximal conversion efficiency is guaranteed.

A Gires-Tournois interferometer (GTI) is an optical standing-wave resonator similar to a Fabry-Perot interferometer (FPI) but with a partially reflective (PR) front side and a high reflective (HR) backside (FIG. 3). Because the backside of the GTI is highly reflective, the GTI does not transmit any light (all the light is back reflected). Still the GTI has intra-cavity intensity enhancement (resonances) similar to a FPI with a free spectral range given by $$FSR = \frac{c}{2Ln}.\qquad(8)$$

Figure 6:
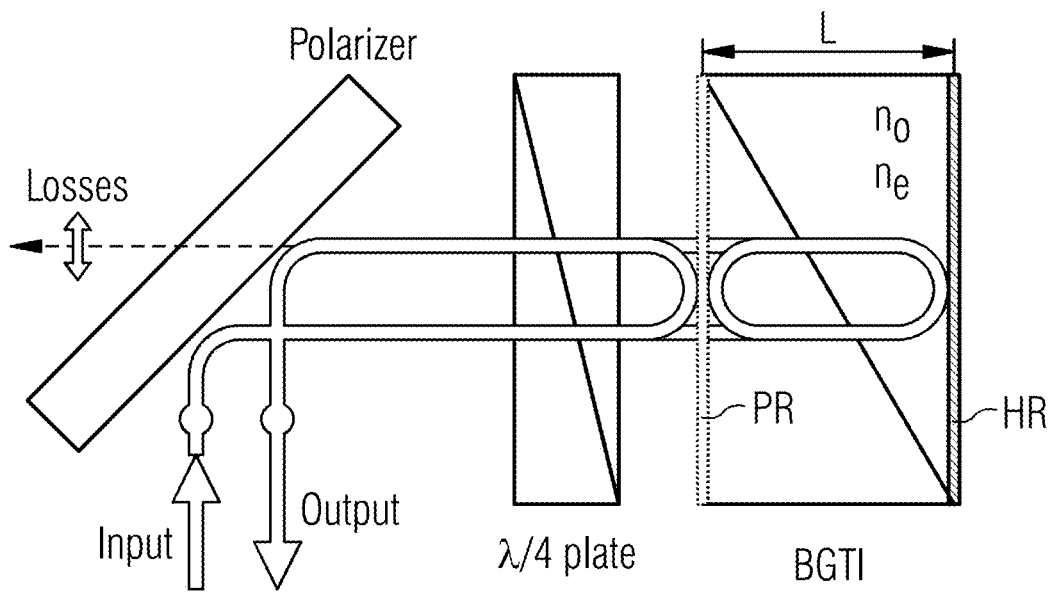
FIG. 6 schematically a high-power frequency-selective system consisting of a polarizer (in this case a TFP: thin-film polarizer), a λ/4-plate and the proposed nonlinear element that acts as a birefringent Gires Tournois interferometer (BGTI); the transmission curve (T=Output/Input) of this system depends on the laser wavelength through the wavelength-dependent relative phase shift of the ordinary and extra-ordinary polarization components of the pump radiation in the BGTI.

As no light is transmitted through the backside of the GTI, it is exemplarily possible to contact the backside of the GTI to a heat sink. In this way a heat management similar to the thin-disk laser can be obtained. Because the reflectivity of a GTI is unity at all wavelengths, the GTI does not act as wavelength selective element by itself. Yet, similar to a FPI the reflected light of a GTI shows a wavelength-dependent and polarization-dependent phase shift that can be used to obtain wavelength-selectivity when combined with a polarizer and a λ/4-plate as shown in FIG. 6. The transmission (T=Output/Input) of the polarizer+λ/4-plate+BGTI system as a function of the laser pump frequency f is given by $$T = \frac{1-R}{R^2 - R\cos(8\pi f L\, n\, c^{-1}) + 1}\qquad(9)$$

where R is the PR coating reflectivity for the pump, c the speed of light and n=($n_e$+$n_0$)/2 the average refractive index for the ordinary and extra-ordinary polarization components of the pump.

Equation 9 assumes for simplicity that the birefringent GTI produces a λ/4 retardation when passed by the pump beam (in single-pass configuration). Slightly more complex transmission spectra T(f) are obtained when this single-pass retardation deviates from λ/4 but this does not change the working principle of the proposed element.

Figure 7:
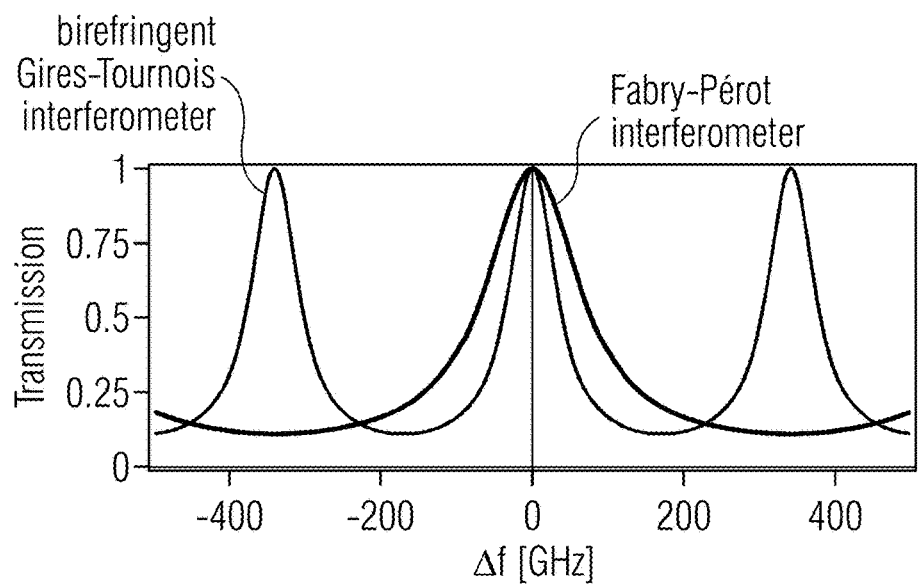
FIG. 7 Transmission curve (T=Output/Input) of the polarizer+λ/4-plate+BGTI system of FIG. 6 (red) compared to the transmission curve of a Fabry-Perot-etalon (black) of similar parameters.

A plot of the transmission curve of Equation 9 is shown in red in FIG. 7 and compared to the transmission curve of a Fabry-Perot-etalon (black) of similar parameters. We assume a Fabry-Perot-etalon made of fused silica (n=1.45 for λ=1030 nm) with 147 µm thickness and 50% reflectivity for both surfaces. The GTI is assumed to be made of crystalline quartz ($n_o$=1.5346 and $n_e$=1.5433 for λ=1030 nm) with 147 µm thickness and 50% PR reflectivity.

Beside the wavelength-dependent losses L (L=1−T) caused by the above described wavelength-dependent transmission of the polarizer+λ/4-plate+BGTI system, also the losses inflicted on the pump radiation caused by the frequency-conversion process need to be considered. These losses are maximal when the conversion efficiency is maximal, i.e., when the laser frequency is resonant with the BGTI resonances. Yet, for cw operation the losses caused by the polarizer+λ/4-plate+BGTI system supersede the losses due to the frequency-conversion process (see FIG. 8 for the SHG case) so that the laser is forced by the nonlinear element to operate at a resonance of the BGTI resulting in single-longitudinal laser operation and efficient frequency-conversion.

Figure 8:
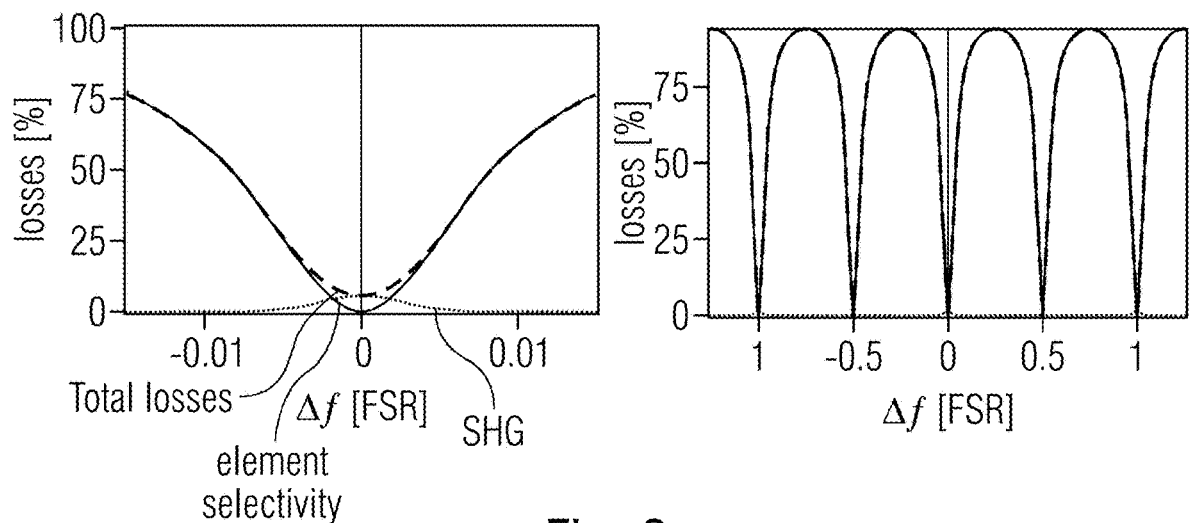
FIG. 8 Frequency-dependent laser losses for the pump mode for two different frequency scales (left and right). The losses inflicted by the polarizer+λ/4-plate+BGTI system are given in red, the losses due to the SHG process are given in green. The dashed black curve represents the sum of the two losses. The frequency is expressed in free spectral range (FSR) units.

FIG. 8 (left) shows the frequency-dependent losses inflicted by the polarizer+λ/4-plate+BGTI system (red), and by the SHG in our proposed element (green). The black dashed curve represents the sum of the two losses. On the right panel the frequency-dependent losses are plotted over a larger frequency range spanning over several resonances of the BGTI, over several FSR. Because the BGTI exhibits resonances with alternating polarization, only every second resonance the polarization is such to have phase matching. Because in steady-state conditions the laser operates at the wavelength with minimal losses, the laser will eventually operate at a BGTI resonance with the inappropriate polarization for frequency-doubling. This issue can be avoided by introducing an additional frequency-selective element in the active laser resonator to increase the losses at the resonances with the inappropriate (for phase matching) polarization. Fortunately, these resonances are much further spaced than the longitudinal modes of the laser resonator making their selection simple and reliable.

Various additional frequency-selective elements can be used for this purpose. The most promising is a (guided mode resonance) grating that also acts as the polarizer of the polarizer+λ/4-plate+BGTI system of FIG. 6.

High-power lasers, usually cannot be operated in single-frequency mode, as they are typically realized as linear resonators. Indeed, the resulting standing-wave pattern in the active medium of these lasers is leading to spatial hole burning disrupting single-frequency operation. This problem can be solved using a twisted-mode configuration in which two λ/4-plates are inserted before and after the active medium so that back and forth propagating beams have circular polarizations orthogonal to each other. This prevents the formation of standing wave pattern (interference-effects).

The λ/4-plate of the polarizer+λ/4-plate+BGTI system can be positioned as shown for example in FIG. 4 to obtain a twisted-mode configuration where the active medium is placed in between the proposed element and the λ/4-plate.

Hänsch-Couillaud Locking

As mentioned above, the transmission curve T related to the polarizer+λ/4-plate+BGTI system forces the laser to operate at the laser frequency that better matches the maximum of T. However, a frequency-drift of the laser or of the element resonances may lead to mode jumps as the mode which is momentarily closest to the maximum of T (minimal losses) is getting amplified and becomes dominant. This disrupts stable single-frequency operation.

Figure 9:
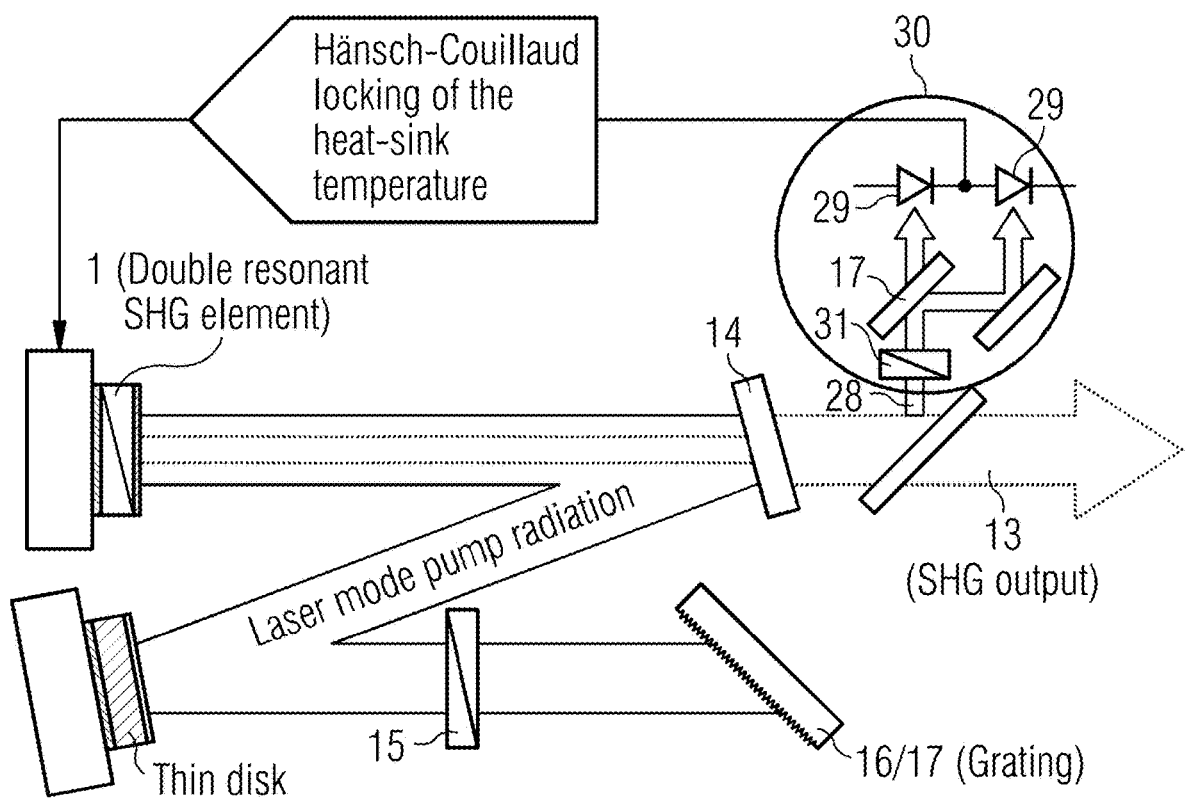
FIG. 9 schematically a thin-disk laser at 1030 nm with intra-cavity frequency-doubling based on the proposed nonlinear SHG element.

These mode jumps can be suppressed by actively stabilizing the pump wavelength to a resonant frequency of the proposed element or vice versa. The proposed nonlinear element offers the possibility to obtain such an active stabilization: indeed, a frequency mismatch between the element resonance and the frequency of the running laser produces a change of the pump polarization that can be monitored and used in a control loop. For example, balanced photodiodes and a polarizer can be used as shown in FIG. 9 to measure the polarization of the pump light leaking the laser resonator. The photo-current difference in the two diodes depends on the frequency offset between the laser frequency and the element's resonance. This difference can be used in a Hänsch-Couillaud locking scheme as an error signal to act either on the laser resonator (e.g. resonator length) to tune the frequency of the laser to match the frequency of a BGTI resonance, or to act on the temperature of the BGTI to tune one of its resonances to match the laser frequency. Note that the Hänsch-Couillaud locking scheme can be realized to automatically select only the resonances with the correct polarization needed for frequency-conversion.

The particular embodiment of FIG. 9 shows a twisted-mode thin-disk laser with intra-cavity SHG based on the proposed element with a Hänsch-Couillaud scheme locking a resonance of the element to the operational wavelength of the laser by acting on the temperature of the heat sink in thermal contact with the element. A grating roughly selects one of the resonances of the element.

Figure 10:
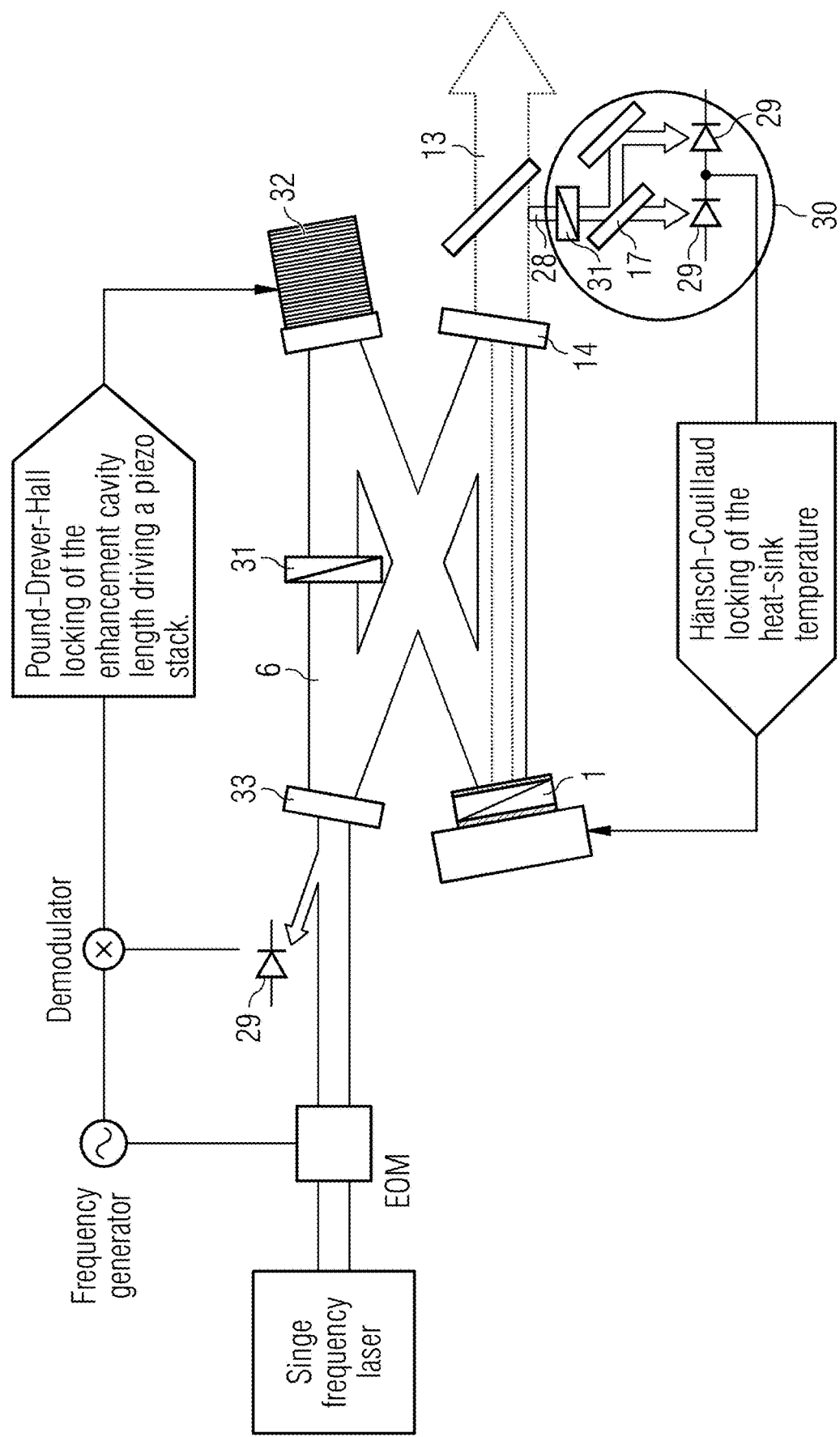
FIG. 10 schematically a single-frequency pump laser at 1030 nm with a subsequent SHG stage where the proposed SHG element is placed into an external enhancement cavity.
Figure 11:
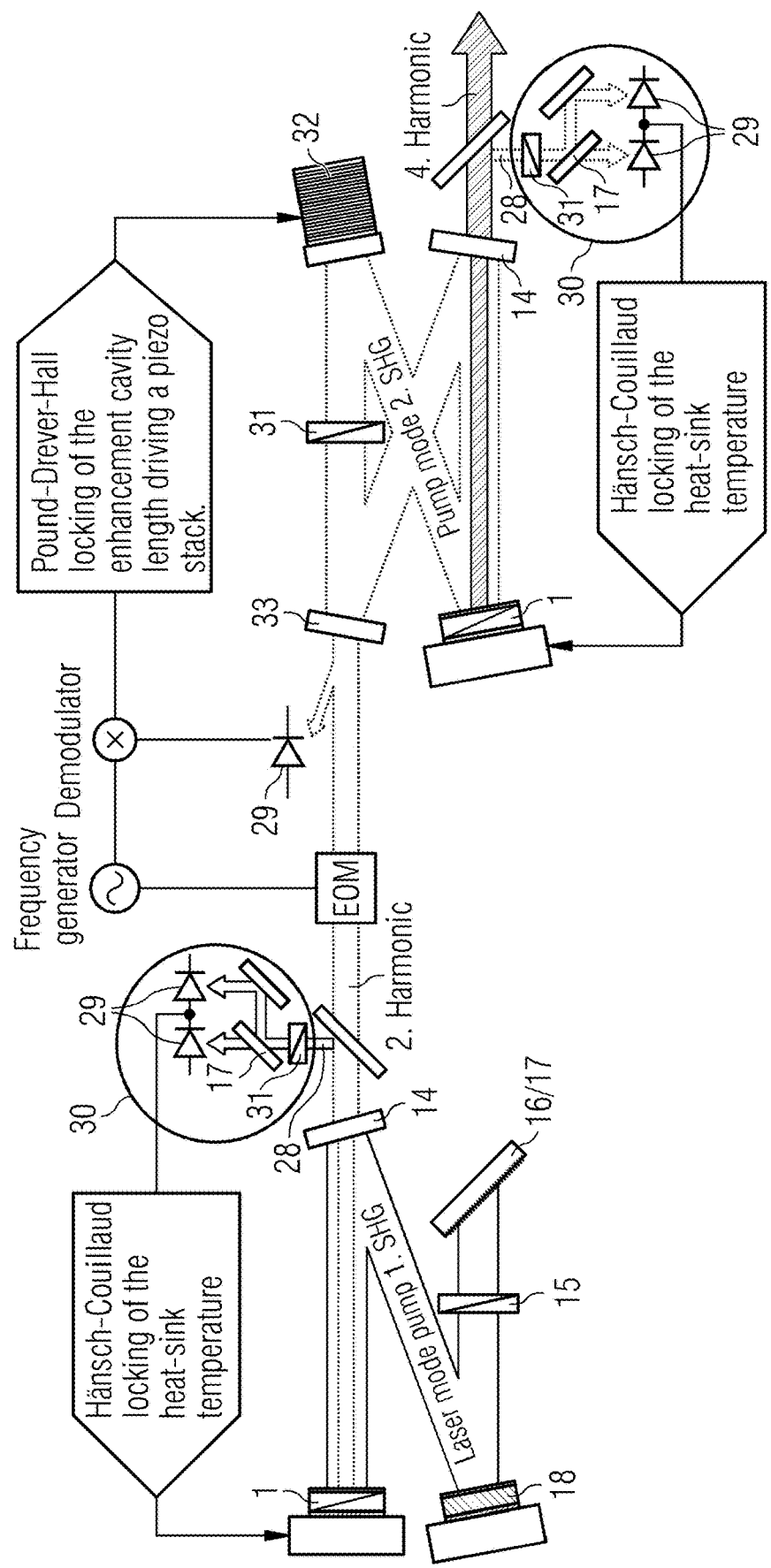
FIG. 11 schematically a fourth-harmonic generation scheme using two successive SHG stages: the first within the 1030 nm active laser resonator (intra-cavity), the second in an external cavity enhancing the 515 nm radiation.

Section: Alternative Applications of the Present Invention
SHG in a Passive Enhancement Cavity In CW operation the conversion efficiency that can be obtained by reflecting a pump beam at the proposed nonlinear SHG element is small. However, the nonlinear SHG element can be utilized also as shown in FIG. 10 in a passive (outside a laser resonator) cavity that enhances the intensity of the pump radiation providing efficient frequency-doubling. In this particular design the length of the passive cavity is locked to the pump frequency using a Pound-Drever-Hall locking scheme to have resonant pump intensity enhancement, and a resonance of the element is also matched to the pump frequency using a Hänsch-Couillaud lock. This configuration is particularly favorable for:

a) an oscillator-amplifier scheme with subsequent SHG stage (see FIG. 10) and
b) a scheme providing frequency-quadrupling (see FIG. 11).

Intra-Cavity Pulsed SHG

Figure 12:
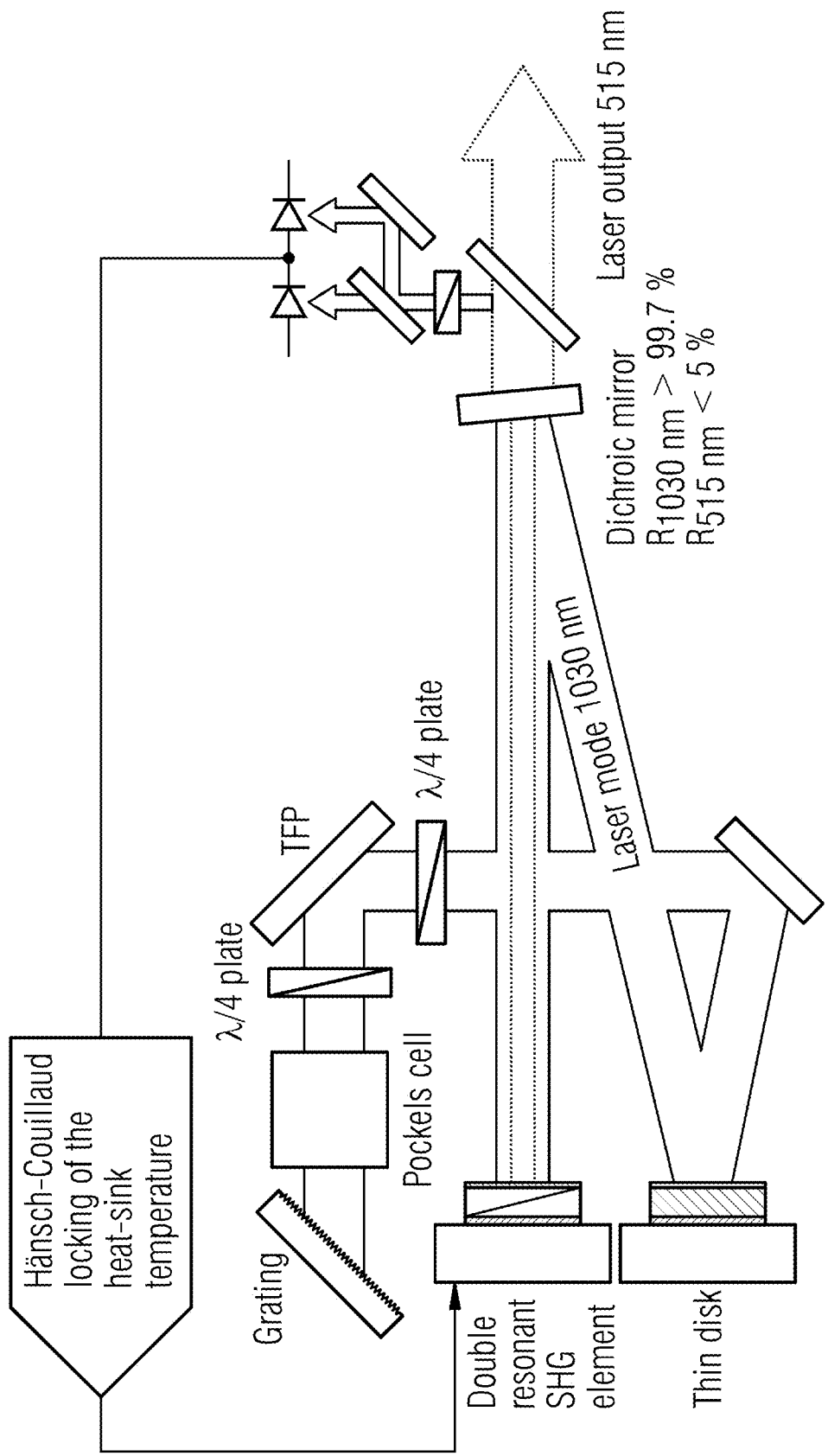
FIG. 12 schematically a Q-switched laser at 1030 nm with intra-cavity SHG, apt particularly for µs-long pulses.

The nonlinear SHG element can be used intra-cavity within a Q-switched laser resonator to generate high energy pulses as shown in FIG. 12. This applies in particular for pulses of µs-duration. This design provides thus single-frequency laser pulses with a very compact layout.

Single-Refection Pulsed SHG

Figure 13:
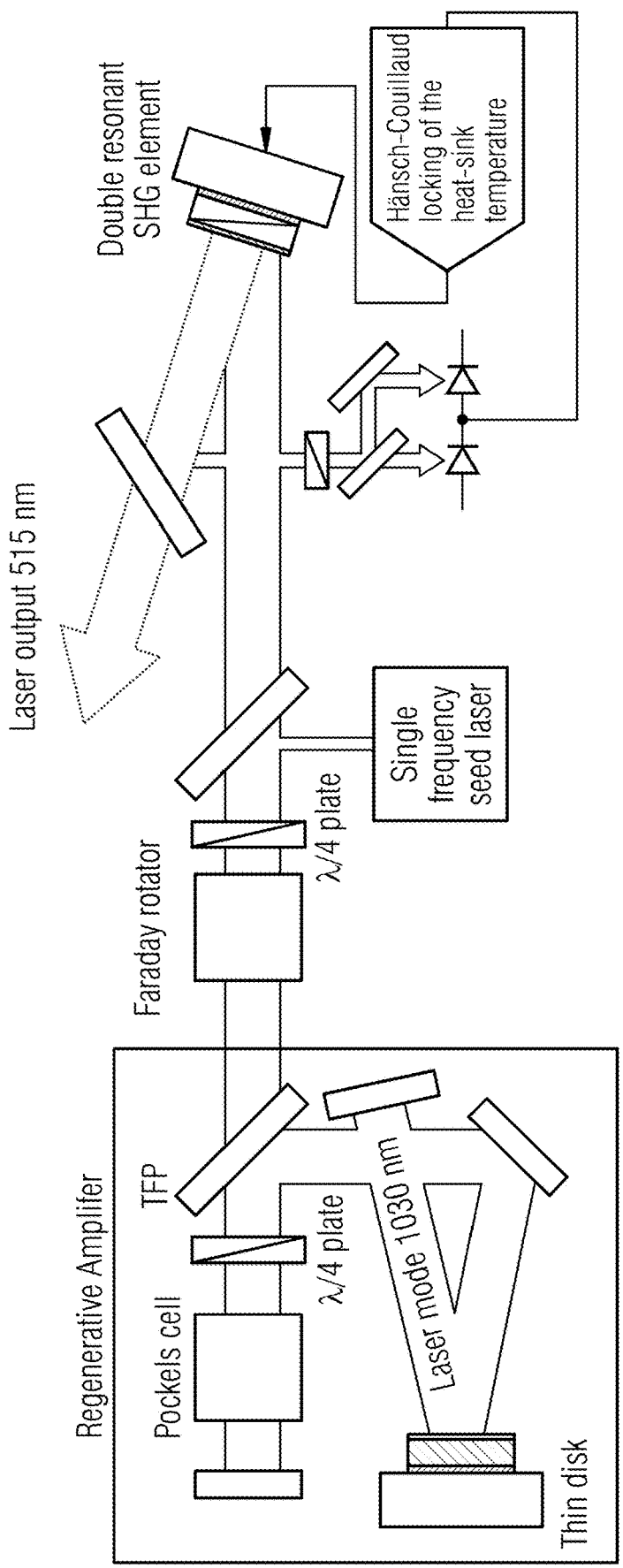
FIG. 13 schematically a single-frequency seed laser at 1030 nm followed by a Q-switched regenerative amplifier and extra-cavity SHG generation occurring in a single-reflection at the SHG element.

For short pulses the peak pump intensity is so high that there is no need of placing the proposed element into a laser resonator or a passive enhancement cavity. In this case, the pump beam can be simply reflected at the doubly-resonant nonlinear SHG element (FIG. 13). A Hänsch-Couillaud locking scheme can be used to tune the temperature of the doubly-resonant SHG element so that its resonance frequency matches the frequency of the pump beam impinging on the element. This scheme is particularly suited for ns-long pulses, as these pulses are still sufficiently long to provide complete intensity enhancement in the doubly-resonant SHG element.

Continuously Tunable Intra-Cavity SHG

Figure 14:
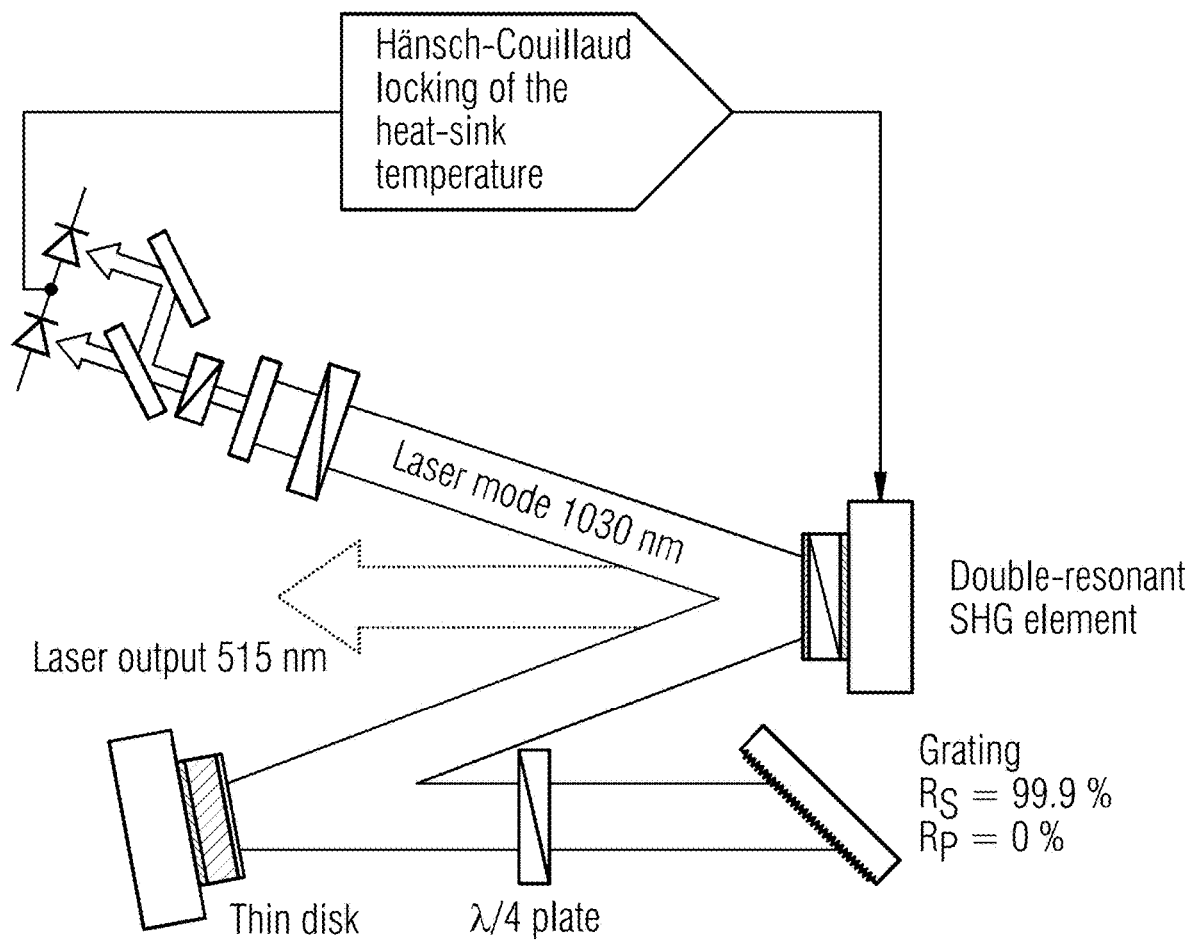
FIG. 14 schematically a thin-disk laser at 1030 nm with intra-cavity frequency doubling where the SHG element is used as a turning mirror.

The above described SHG schemes can only be frequency tuned in steps corresponding to twice the free spectral range of the birefringent element. Instead of using the proposed SHG element as a resonator end-mirror, it can be used as a turning mirror (under an incident angle of a few degrees) as shown in FIG. 14. This layout allows to continuously tune the frequency of the converted radiation within the limits given by the gain profile of the active laser medium. In this V-shaped configuration two different operational modes can be selected simply by changing the phase matching conditions:

1. The frequency-doubled beam propagates along the direction of the fundamental mode using the same phase matching condition as above $k_{SHG}=2k_p$. This scheme shows completely free wavelength tunability but generates two frequency-doubled beams of equal power (for the back and forth propagation).
2. The frequency-doubled beam is generated at 0° incidence as shown in FIG. 14. Here the more general phase matching condition has to be considered: $\vec{k}_{SHG}=\vec{k}_{p1}+\vec{k}_{p2}$. This configuration generates only a single output beam that is directly extracted without passing any optical elements.

Applications of the Present Invention as an Optical Parametric Oscillator (OPO)

In an optical parametric oscillator (OPO) each pump photon is split in two photons called signal and idler: from energy conservation only certain frequency combinations are possible $\omega_p=\omega_{signal}+\omega_{idler}$, while phase matching conditions requires $\vec{k}_p=\vec{k}_{signal}+\vec{k}_{idler}$. Note the polarization of the three involved laser frequencies in this case can be chosen freely according to the properties of the nonlinear crystal.

For efficient frequency conversion the OPO laser needs to be resonant for all the three involved wavelengths. Apparently the simplest solution would be to make the proposed element resonant for all three wavelengths. However, its realization requires precise knowledge of the nonlinear crystal thickness (down to the nm level). In addition, even if an element with triple-resonance was realized, very limited transversal and longitudinal mode selectivity would be obtained due to the shortness of the element.

Therefore, the most promising OPO design based on the proposed element would make use of an external resonator for e.g. the signal radiation and a doubly-resonant (for pump and idler) element. This external signal resonator provides transverse and longitudinal mode selectivity and it can be tuned in length to reach the triple-resonant condition that maximizes conversion-efficiency. A frequency selective element can be placed within this external resonator. By tuning the signal wavelength several resonances of the idler (in the OPO element) can be selected.

Note that the role of idler and signal can be swapped throughout this patent.

Intra-Cavity OPO Element with Collinear Signal Resonator

Figure 15:
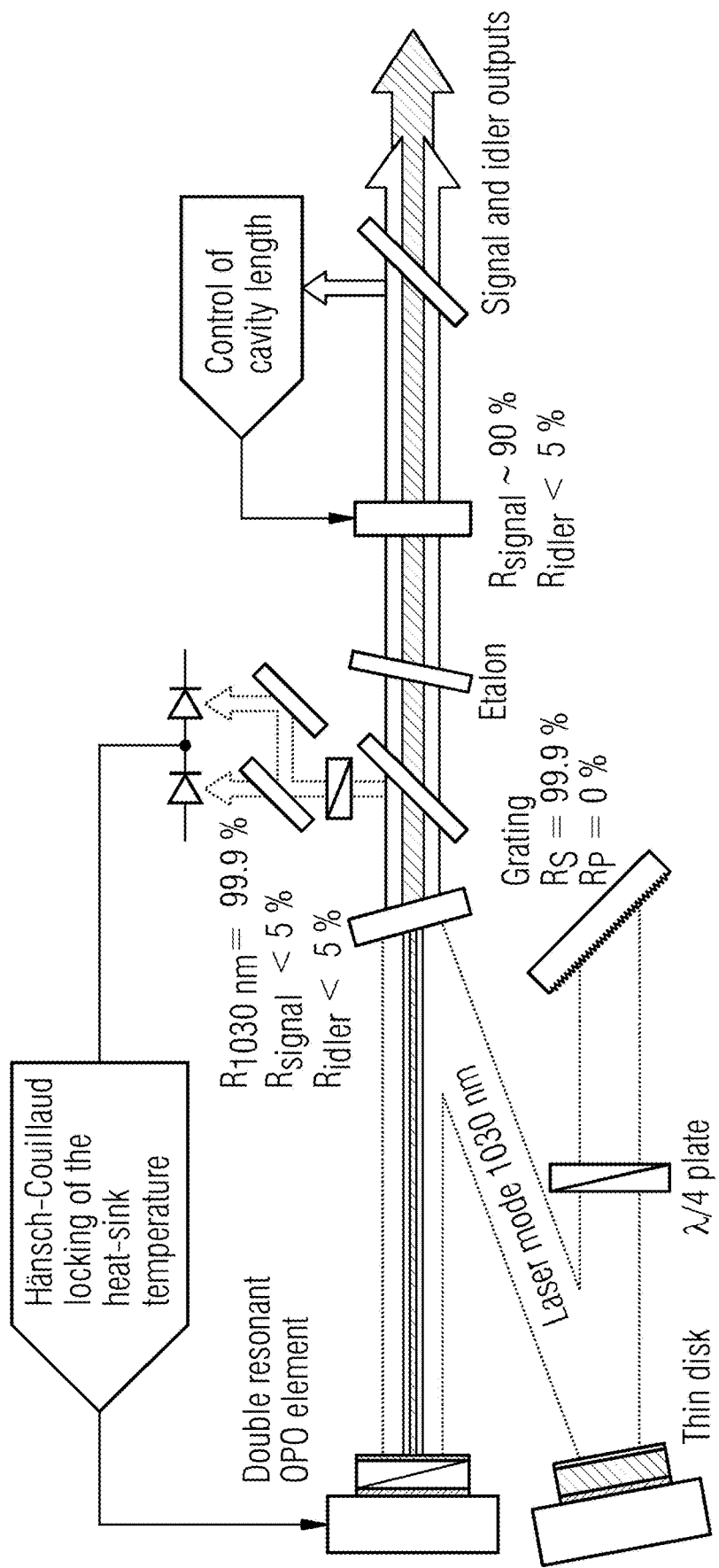
FIG. 15 schematically a thin-disk laser operating at nm with the proposed element used as intra-cavity OPO and with an additional collinear resonator for the signal (red) radiation.

A simple intra-cavity OPO with good beam quality is realized by employing a collinear resonator for the signal radiation comprising also an out-coupler and optionally a frequency selective element. One of this embodiment is shown in FIG. 15. The OPO element thus acts as a resonator end-mirror for both the pump and the signal radiation.

Intra-Cavity OPO Element with V-Shaped Signal Resonator

Figure 16:
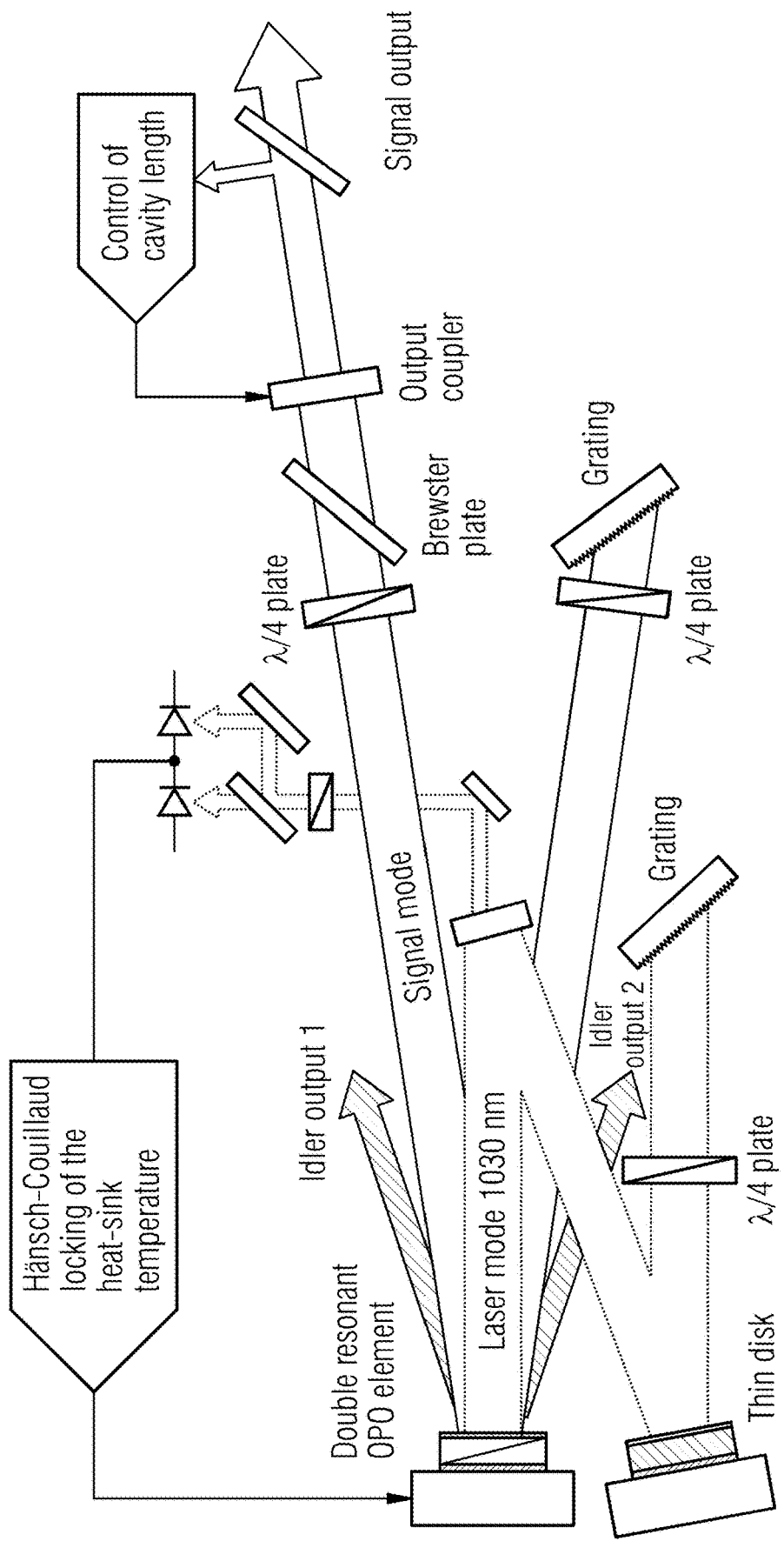
FIG. 16 schematically a thin-disk laser operating at 1030 nm with the proposed element used as intra-cavity OPO and with an additional V-shaped resonator for the signal (red) radiation.

Continuous tunability of the OPO can be obtained making use of a V-shaped signal resonator as shown in FIG. 16. In this case, the nonlinear OPO element acts as an end-mirror for the pump and as turning mirror for idler and signal. The phase matching in the nonlinear crystal is fulfilled for non-collinear propagation ($\vec{k}_p=\vec{k}_{signal}+\vec{k}_{idler}$) so that all three beams have different directions. Another advantage of this layout is given by the absence of dichroitic mirrors so that losses are minimized.

OPO Element in a Passive Enhancement Cavity

Figure 17:
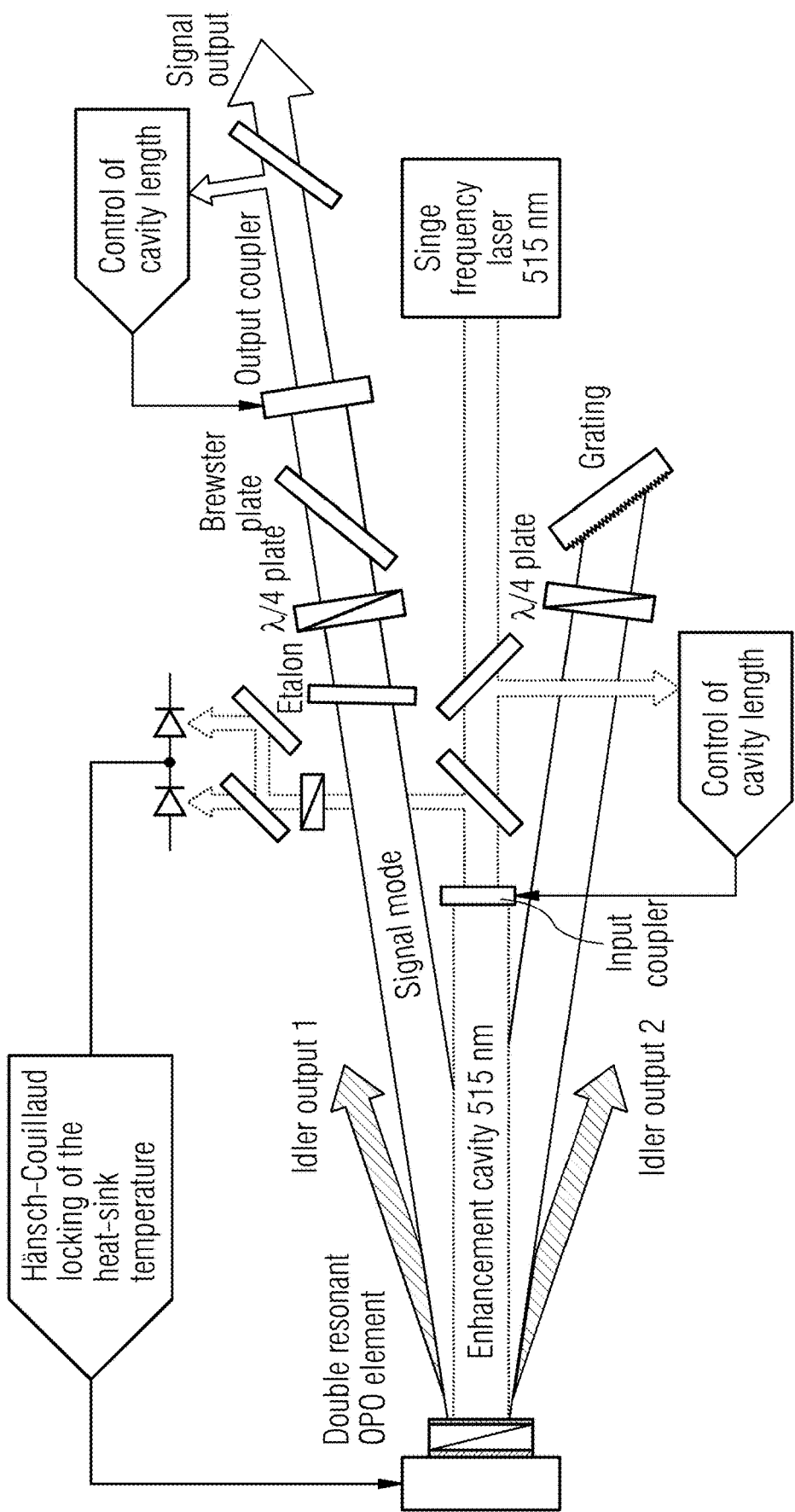
FIG. 17 schematically a passive enhancement cavity pumped by a single-frequency laser at 515 nm and containing the proposed doubly-resonant OPO element. The element is also used as a turning mirror in a V-shaped cavity for the signal radiation.

The doubly-resonant OPO element can be placed in a passive (outside an active laser resonator) cavity enhancing the pump radiation delivered by a preferably single-frequency pump laser (see FIG. 17). To improve conversion efficiency, the OPO element can be placed in a second external cavity enhancing the signal intensity (see for example V-shaped cavity in FIG. 17). In an alternative embodiment the enhancement of the pump and signal radiation can be obtained within a single external cavity.

This scheme with external (to the laser) application of the OPO-element applies particularly for pump lasers having an oscillator-amplifier configuration, or having intra-cavity frequency-doubling. Of particular interest is for example the wavelength region between 550 and 1000 nm, that could be covered starting with a pump beam at 515 nm produced by a thin-disk laser with intra-cavity frequency doubling.

Intra-Cavity Pulsed OPO

Figure 18:
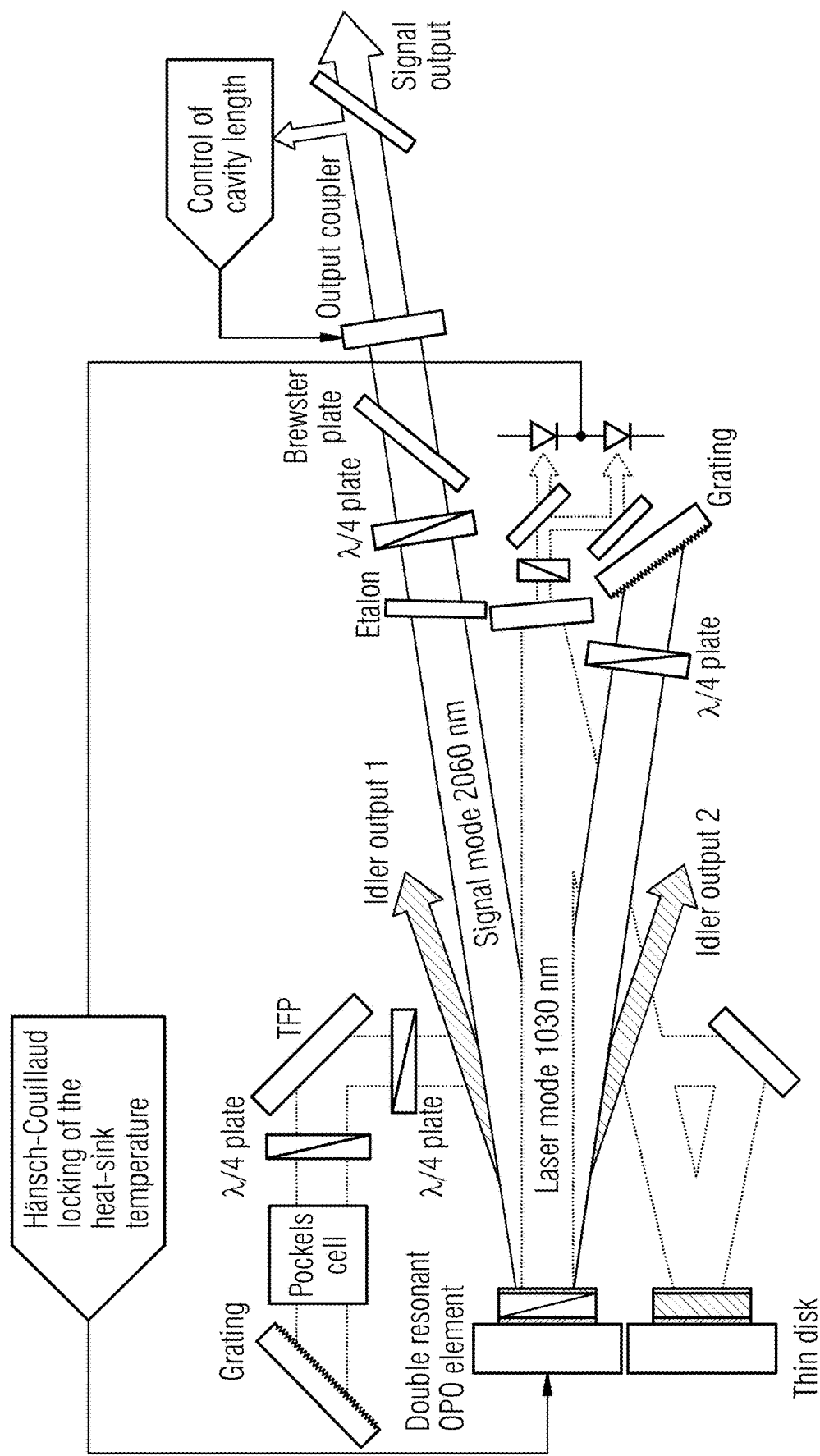
FIG. 18 schematically a Q-switched thin-disk laser operating at 1030 nm with intra-cavity OPO element and V-shaped signal cavity, apt particularly for µs-long pulses.

The doubly-resonant OPO element can be used in a Q-switched laser resonator to generate high energy laser pulses at longer wavelengths compared to the pump. The pulses need to be long compared to the round-trip time in the laser and signal resonators to have complete intensity enhancement. FIG. 18 shows a particular embodiment of this scheme based on a Q-switched thin-disk laser operating at 1030 nm with intra-cavity OPO element and a V-shaped signal cavity.

Pulsed OPO with External Signal Cavity and without Pump Enhancement Cavity

Figure 19:
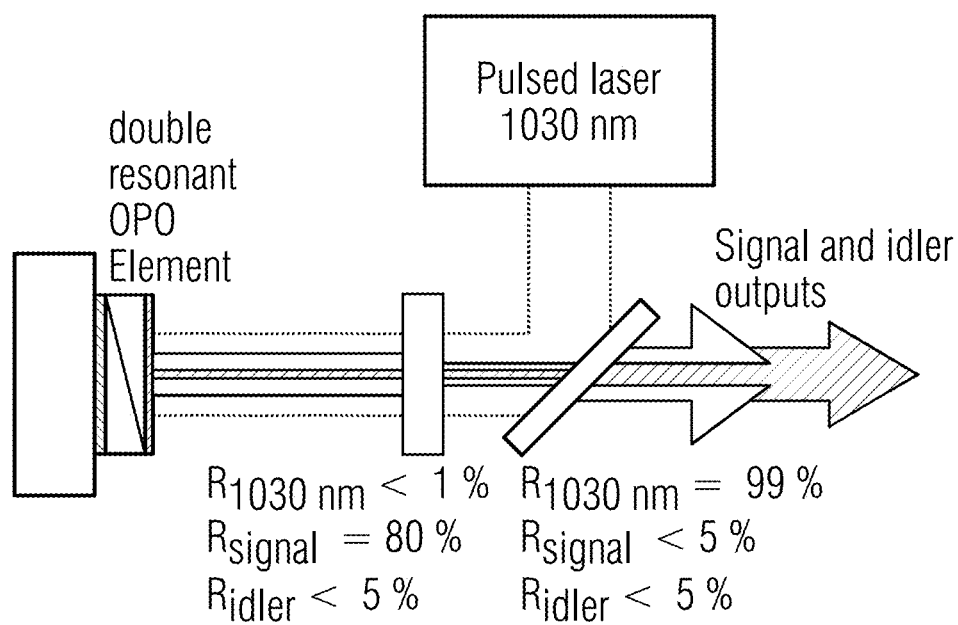
FIG. 19 schematically an external passive cavity for the signal radiation containing an OPO element pumped with a pulsed laser at 1030 nm.

The doubly-resonant (pump and idler) OPO element can be placed in an external cavity for the signal radiation as shown in FIG. 19. This configuration is suited for the down-conversion of laser pulses.

Laser with Self-Seeding at $1.5\lambda_p$

A laser containing both an OPO element and a SHG element according to our invention can be used to generate radiation at a wavelength of $1.5\lambda_p$, where $\lambda_p$ is the pump wavelength.

Half-Harmonic Generation (HHG)

The nonlinear element can be designed to operate as a frequency-halving element, where each pump photon is split into an idler and a signal photon having the same frequency so that $\omega_p=2\omega_{HHG}$ and $k_p=2k_{HHG}$. This degenerate OPO layout has two advantages:

- Similarly, to a doubly-resonant SHG element it is inherently resonant for all involved frequencies without increased requirement in precision of the manufacturing process (when the pump beam is resonant with the element, also the frequency-halved radiation matches a resonance of the element).
- Because the idler coincides with the signal, all the frequency-converted photons are part of the "useful" output of the laser.

Owing to the large phase matching acceptance close to degeneracy, an external resonator is typically required for the frequency-halved radiation to provide transverse and longitudinal mode selectivity.

Intra-Cavity HHG with Collinear Signal Resonator

Figure 20:
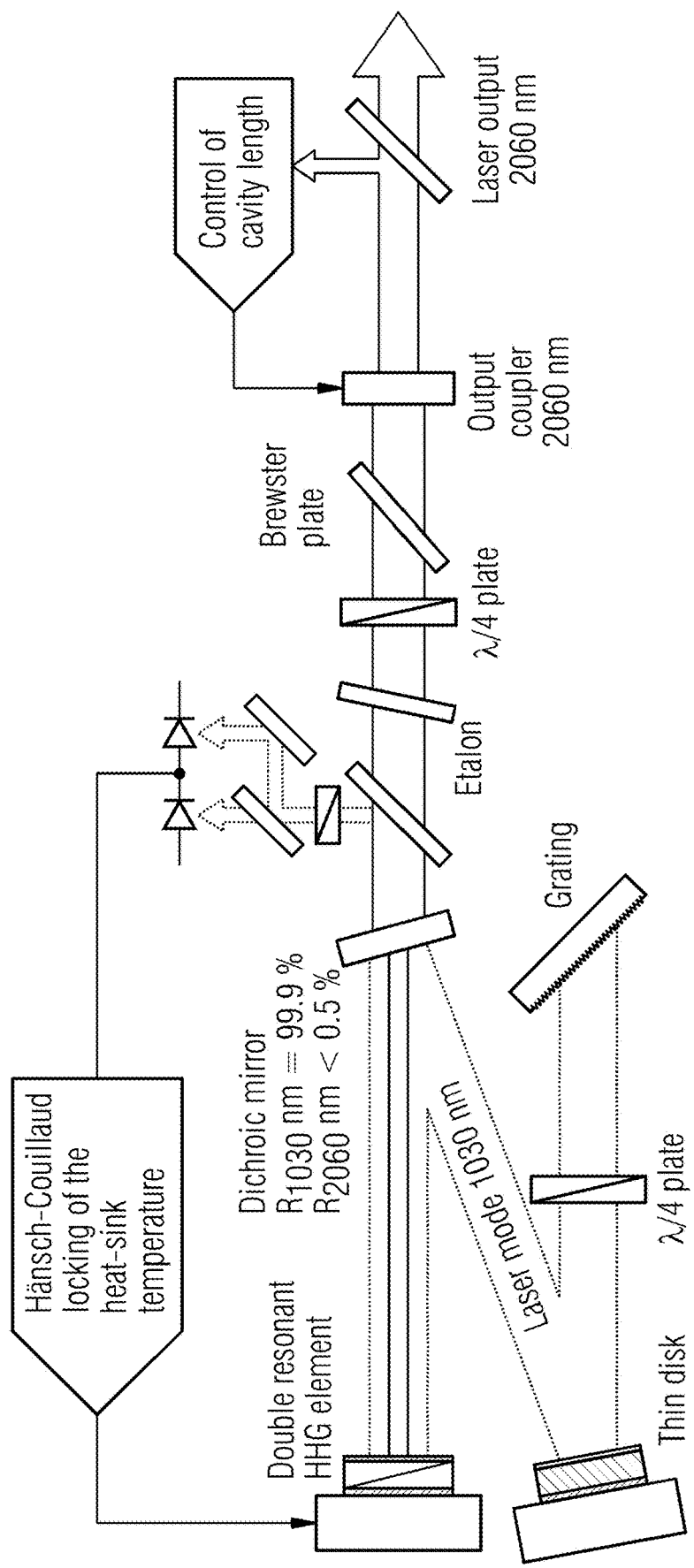
FIG. 20 schematically a thin-disk laser at 1030 nm with intra-cavity half-harmonic generation and external collinear cavity for the frequency-halved radiation at 2060 nm.

The simplest way to implement intra-cavity half-harmonic generation is to have the OPO element also acting as end-mirror of an external collinear resonator for the frequency-halved radiation (FIG. 20). A control loop can be used to match the frequency of the frequency-halved radiation circulating in the signal cavity to a resonance of the OPO element.

Intra-Cavity HHG with V-Shaped Signal Resonator

Figure 21:
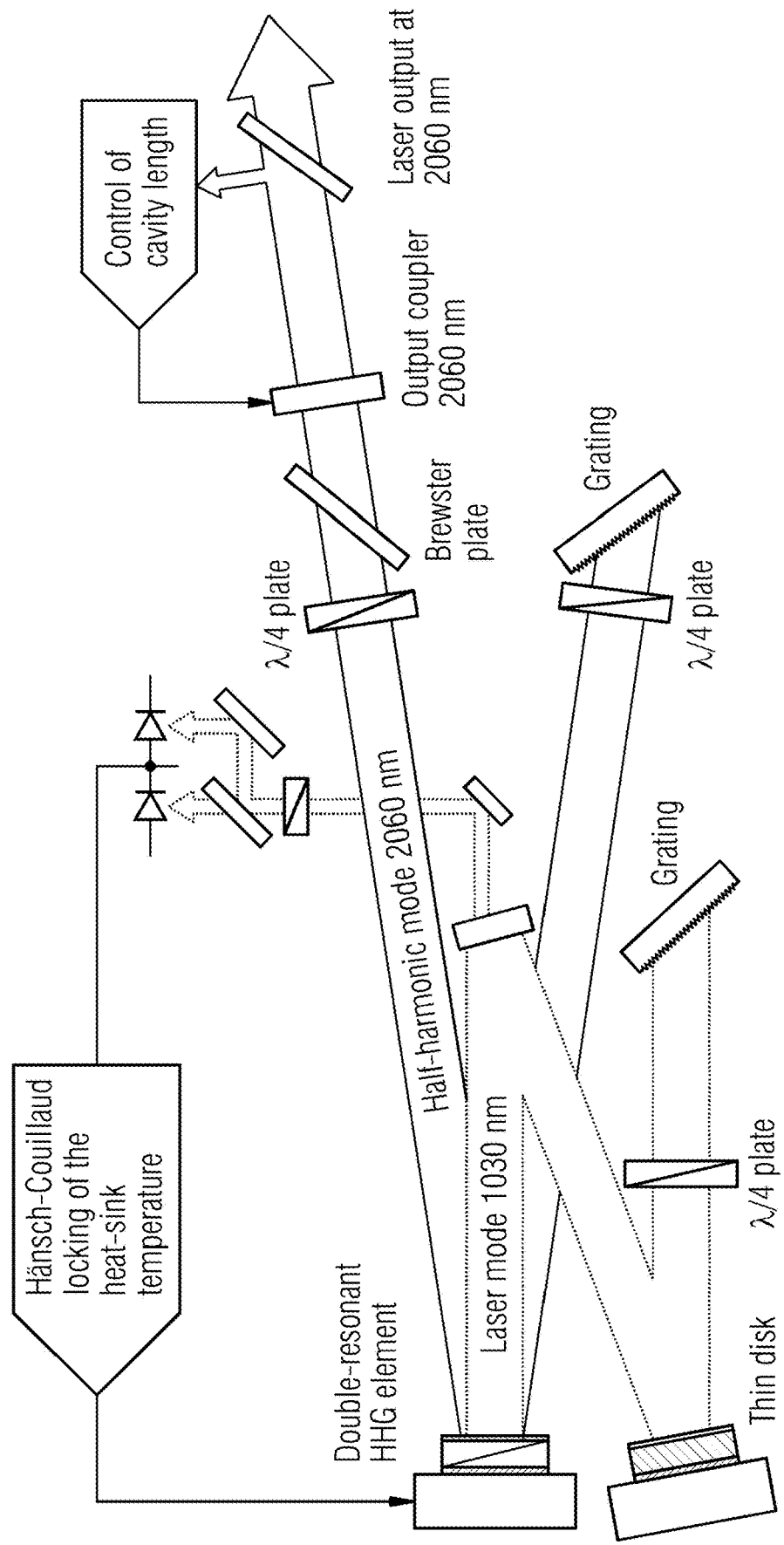
FIG. 21 schematically a thin-disk laser at 1030 nm with intra-cavity half-harmonic generation and external V-shaped cavity for the frequency-halved radiation at 2060 nm.

To provide continuous tuning of the half-harmonic output (within the limits imposed by the gain spectrum of the pump laser), the external signal cavity can be realized in a V-shaped form (see FIG. 21) with the phase matching condition taking the form $\vec{k}_p=\vec{k}_{HHG1}+\vec{k}_{HHG2}$. This design offers all the advantages of the half-harmonic generation with collinear resonator while avoiding losses in the dichroitic mirrors.

HHG in Passive Enhancement Cavity for the Pump and Signal Resonator

The doubly-resonant HHG element can be utilized also outside of an active laser resonator. Efficient wavelength conversion can be obtained by placing the element within a passive cavity for the pump radiation whose cavity length can be locked to be resonant to the pump frequency.

Figure 22:
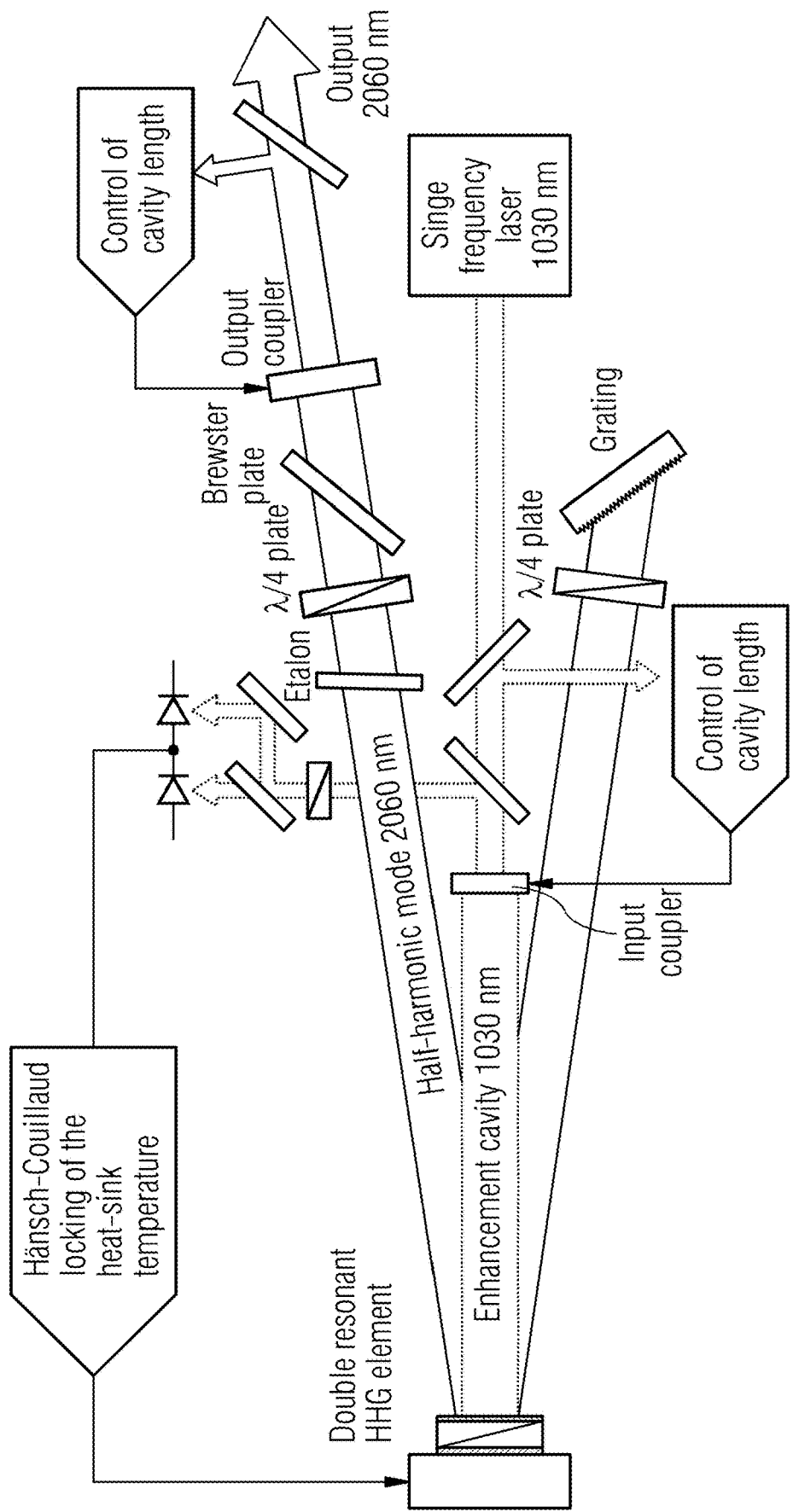
FIG. 22 schematically a passive cavity enhancing the pump radiation delivered by a single-frequency laser at 1030 nm equipped with a HHG element that also acts as a mirror within a cavity enhancing the frequency-halved radiation.

The conversion efficiency can be increased when the HHG element is also part of a second cavity enhancing the intensity of the frequency-halved radiation and selecting the degenerate mode. See a particular embodiment for a V-shaped cavity in FIG. 22. In an alternative embodiment the enhancement of the signal and pump radiation can be obtained within a single external cavity.

Figure 23:
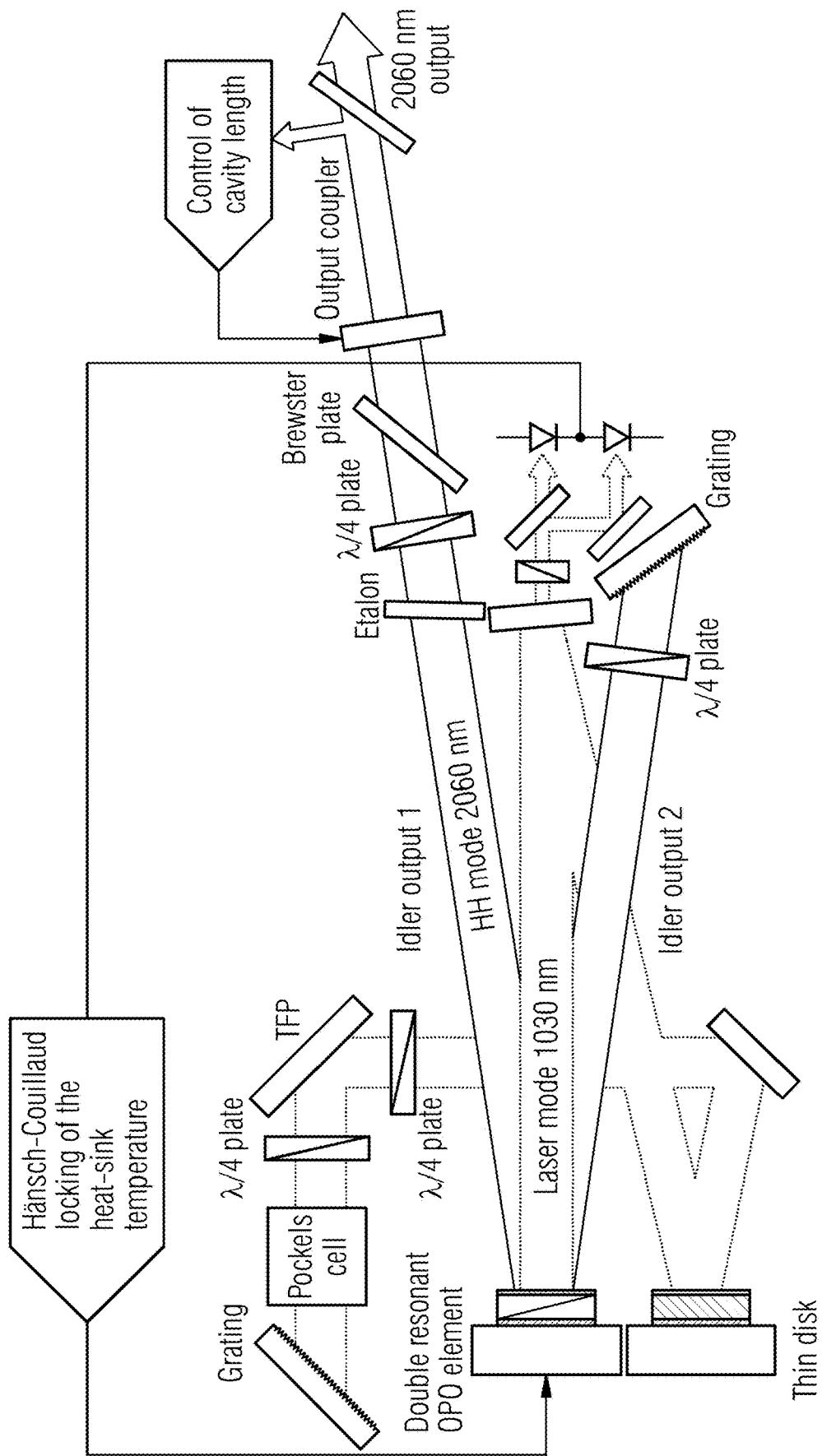
FIG. 23 schematically a Q-switched laser at 1030 nm with intra-cavity HHG and an external cavity for the frequency-halved radiation, apt particularly for µs-long pulses.

Intra-Cavity Pulsed HHG in a Q-Switched Laser with a Resonator Circulating the Frequency-Halved Radiation The doubly-resonant OPO-element for half-harmonic generation can be used in a Q-switched laser resonator to generate pulses of high energy (see FIG. 23). The pump pulses need to be long compared to the round-trip time in the signal resonator to build-up the signal intensity.

Single-Reflection Pulsed HHG

Figure 24:
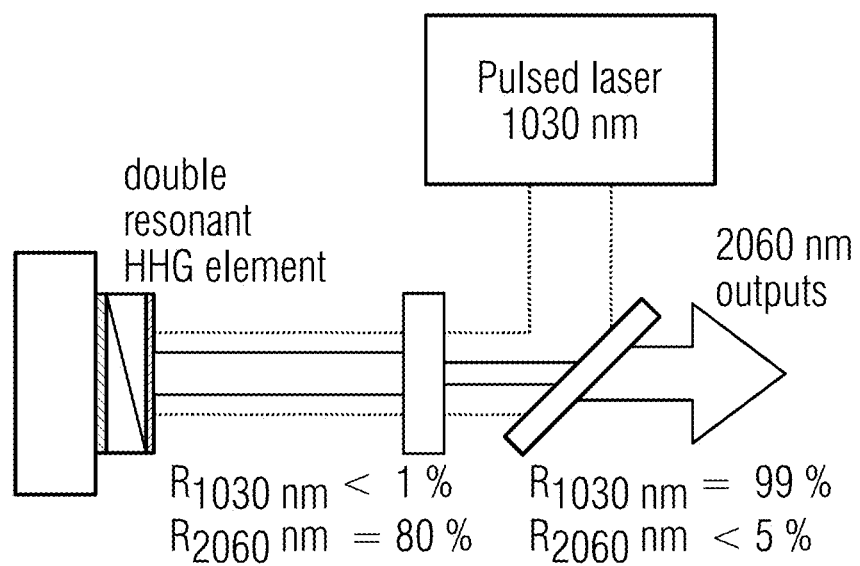
FIG. 24 schematically a passive cavity for the frequency-halved radiation containing a HHG-element pumped with a pulsed laser at 1030 nm.

For short pulses, in particular ns pulses, it is possible to operate the doubly-resonant nonlinear OPO element without any enhancement cavity for the pump radiation, simply by reflecting a pump beam at the element. A better control of the transverse and longitudinal properties of the frequency-halved beam could be obtained either using an external signal cavity (see FIG. 24) or through injection seeding of the signal.

Mode-Locked Operation of a Doubly-Resonant HHG Element

Type I parametric frequency conversion has a particularly large phase matching acceptance around the degenerate region. Therefore, the HHG element can be used to realize a powerful mode-locked laser with high repetition rates. Mode-locking could be enforced by a proper design of the HR and PR coatings of the element. In particular, the HR coating of the element can be designed to compensate for the dispersion of the signal radiation.

LIST OF REFERENCE NUMBERS

1. Nonlinear optical element, i.e. doubly-resonant SHG element
2. Nonlinear birefringent crystal
3. High reflective dichroic coating (HR) for pump and frequency-doubled beams causing phase shifts fulfilling the condition $\Delta\varphi_p=2\Delta\varphi_{SHG}$ upon an internal reflection.
4. Partly reflective dichroic coating (PR) for pump and frequency-doubled beams causing phase shifts fulfilling the condition $\Delta\varphi_p=2\Delta\varphi_{SHG}$ upon an internal reflection.
5. Heat sink
6. Mode of the pump radiation
7. Incident pump radiation with polarization fulfilling neither the resonance nor the phase matching conditions within the nonlinear optical element 1
8. Reflected pump radiation fulfilling neither the resonance nor the phase matching conditions within the nonlinear optical element 1
9. Incident pump radiation with polarization fulfilling both the resonance and the phase matching conditions within the nonlinear optical element 1
10. Resonantly enhanced pump radiation circulating in the element with polarization fulfilling the phase matching conditions within the nonlinear optical element 1
11. Reflected pump radiation with polarization fulfilling both the resonance and the phase matching conditions within the nonlinear optical element 1
12. Resonant frequency-doubled radiation
13. Extracted frequency-doubled radiation
14. Dichroic mirror (HR for the pump radiation, AR for the frequency-doubled radiation)
15. Quarter wave plate for the pump radiation
16. Frequency-selective element (e.g. resonant waveguide grating) for the pump radiation
17. Polarization selective element (e.g. resonant waveguide grating) for the pump radiation 18. Thin-disk laser active medium contacted to a heat sink
19. Active laser medium
20. Anti-reflex coating
21. High reflective coating for the laser wavelength (pump)
22. Incident signal radiation
23. Signal radiation reflected at the HR coating of the element
24. Resonantly enhanced idler radiation circulating in the element
25. Idler radiation extracted from the element
26. Dichroic coating (PR for the pump radiation, AR for the signal radiation, PR for the idler radiation)
27. High-reflective coating (HR) for all involved wavelengths with relative phase shifts fulfilling $\Delta\varphi_p = \Delta\varphi_{signal} + \Delta\varphi_{idler}$ upon an internal reflection.
28. Pump radiation leaking through a HR mirror
29. Photodiode
30. Balanced polarization detector
31. Half-wave plate
32. Piezoelectric stack
33. Partly reflective mirror

The invention claimed is:

1. A system for frequency-conversion of a pump radiation, the system comprising:
   i) a laser source generating the pump radiation;
   ii) a nonlinear optical element for frequency-conversion of the pump radiation, said nonlinear optical element including a nonlinear birefringent crystal shaped as a thin plate, said thin plate having a thickness and having a front-surface and a back-surface with a size in all directions being larger than said thickness, said nonlinear optical element generating at least one frequency-converted beam as compared to a frequency of the pump radiation, and all involved beams propagating fulfilling phase matching or quasi-phase matching conditions in said nonlinear optical element;
   iii) said nonlinear optical element including a partial reflective coating at said front-surface and a high-reflective coating at said back-surface of said nonlinear crystal yielding to resonant intensity enhancement of the laser pump radiation and at least one of the frequency-converted beams, said high-reflective coating being configured to reflect all involved wavelengths and to conserve or adjust a relative phase delay between the at least one frequency-converted beam and the pump radiation upon an internal reflection for maintaining the relative phase delays between various beams yielding optimal frequency-conversion;
   iv) a heat sink in thermal contact with said nonlinear optical element, said heat sink having a controllable temperature enabling efficient cooling of said nonlinear crystal and generating a temperature gradient in said nonlinear crystal substantially orthogonal to said back-surface and approximatively in a direction of propagation of laser beams, and reducing a temperature inhomogeneity in said nonlinear crystal, for decreasing phase matching inhomogeneity between the various beams.

2. The system according to claim 1, wherein said back-surface of said high-reflective coating of said nonlinear optical element is in thermal contact with said heat sink, and the temperature inhomogeneity in said nonlinear crystal is reduced in the transverse direction relative to the direction of propagation of the laser beams, for decreasing phase matching inhomogeneity between the various beams in the transverse direction.

3. The system according to claim 1, wherein:
   said nonlinear optical element provides frequency-doubling (second-harmonic generation SHG) of the laser pump radiation; and
   said partial reflective coating is configured to conserve or adjust a relative phase delay between the frequency-doubled and the pump radiation upon an internal reflection within said nonlinear optical element for obtaining intensity enhancement for both the pump radiation and the frequency-doubled radiation while maintaining a relative phase delay between the pump radiation and the frequency-doubled radiation, for increasing frequency conversion.

4. The system according to claim 1, wherein said nonlinear optical element is a mirror in an active laser resonator for a circulating pump beam.

5. The system according to claim 1, wherein said nonlinear optical element is a mirror in a passive enhancement cavity for the laser pump beam.

6. The system according to claim 1, wherein said nonlinear optical element is a mirror in a single-reflection configuration providing frequency-conversion for laser pulses or ns laser pulses.

7. The system according to claim 1, wherein:
   said nonlinear optical element provides frequency-halving of a pump radiation (half harmonic generation (HHG)); and
   said partial reflective coating is configured to conserve or change a relative phase delay between the frequency-halved and the laser pump radiation upon an internal reflection within said nonlinear optical element, for obtaining intensity enhancement for both the pump and the frequency-halved radiation while maintaining a relative phase delay between the pump radiation and the frequency-halved radiation, for increasing frequency conversion.

8. The system according to claim 7, wherein said nonlinear optical element is a mirror in an active laser resonator for the laser pump radiation, circulating a generated half-harmonic radiation to improve longitudinal and transverse mode selection of the half-harmonic radiation.

9. The system according to claim 7, wherein said nonlinear optical element is a mirror in a passive enhancement cavity for the laser pump radiation, circulating the half-harmonic radiation to improve longitudinal and transverse mode selection of the half-harmonic beam.

10. The system according to claim 7, wherein said nonlinear optical element is a mirror for a laser pump radiation in a single-reflection configuration for laser pulses or ns laser pulses, circulating the half-harmonic radiation to increase longitudinal and transverse mode selection of the half-harmonic radiation.

11. The system according to claim 7, wherein said nonlinear optical element is a mirror in an active laser resonator for the laser pump radiation with both of said partial reflective coating and said high-reflective coating yielding a reflectivity and dispersion to generate mode-locked frequency-halved radiation.

12. The system according to claim 11, wherein the mode-locked frequency-halved radiation has repetition rates in a 100 GHz range.

13. The system according to claim 7, wherein said nonlinear optical element is a mirror in a passive enhancement cavity for the laser pump radiation with both of said partial reflective coating and said high-reflective coating yielding a reflectivity and dispersion to generate mode-locked frequency-halved radiation.

14. The system according to claim 13, wherein the mode-locked frequency-halved radiation has repetition rates in a 100 GHz range.

15. The system according to claim 1, wherein said nonlinear optical element is an optical parametric oscillator converting the laser pump radiation to a signal beam and an idler beam with both of said partial reflective coating and said high-reflective coating yielding a double-resonant intensity enhancement for the pump radiation and the idler beam.

16. The system according to claim 15, wherein said nonlinear optical element is a mirror in an active laser resonator for the pump radiation, circulating the signal radiation to increase a conversion efficiency and improve a longitudinal and a transverse mode selection for the signal beam and indirectly for the idler beam.

17. The system according to claim 15, wherein said nonlinear optical element is a mirror in a passive enhancement cavity for the pump radiation, and said nonlinear optical element also is a mirror in a resonator circulating the signal beam to increase a conversion efficiency and improve a longitudinal and a transverse mode selection for the signal beam and indirectly for the idler beam.

18. The system according to claim 15, wherein said nonlinear optical element is a mirror for the laser pump beam in a single-reflection configuration, for laser pulses and ns laser pulses, and said nonlinear optical element also is a mirror within a resonator circulating the signal beam to increase a conversion efficiency and improve a longitudinal and a transverse mode selection for the signal beam and indirectly for the idler beam.

19. The system according to claim 1, wherein said nonlinear optical element is an optical parametric oscillator converting the laser pump radiation to a signal beam and an idler beam with said partial reflective coating and said high-reflective coating yielding an intensity enhancement for both the pump beam and the signal beam.

20. The system according to claim 19, wherein said nonlinear optical element is a mirror in an active laser resonator for the pump radiation, circulating the idler radiation to increase a conversion efficiency and improve a longitudinal and a transverse mode selection for the idler beam and indirectly for the signal beam.

21. The system according to claim 19, wherein said nonlinear optical element is a mirror in a passive enhancement cavity for the pump radiation, circulating the idler radiation to increase a conversion efficiency and improve a longitudinal and a transverse mode selection for the idler beam and indirectly for the signal beam.

22. The system according to claim 19, wherein said nonlinear optical element is a mirror for the laser pump radiation in single-reflection configuration, for laser pulses and ns laser pulses, circulating the idler radiation to increase a conversion efficiency and improve a longitudinal and a transverse mode selection for the idler beam and indirectly for the signal beam.

* * * * *